US011594029B2

(12) United States Patent
Lee et al.

(10) Patent No.: US 11,594,029 B2
(45) Date of Patent: Feb. 28, 2023

(54) METHODS AND SYSTEMS FOR DETERMINING BALL SHOT ATTEMPT LOCATION ON BALL COURT

(71) Applicant: NEX Team Inc., San Jose, CA (US)

(72) Inventors: Keng Fai Lee, Cupertino, CA (US); Tin Yin Lam, Fremont, CA (US); Wing Hung Chan, Hong Kong (HK); Qi Zhang, Hong Kong (HK); On Loy Sung, Hong Kong (HK); Man Hon Chan, Hong Kong (HK)

(73) Assignee: NEX Team Inc., San Jose, CA (US)

( * ) Notice: Subject to any disclaimer, the term of this patent is extended or adjusted under 35 U.S.C. 154(b) by 0 days.

(21) Appl. No.: 17/829,397

(22) Filed: Jun. 1, 2022

(65) Prior Publication Data
US 2022/0301309 A1   Sep. 22, 2022

Related U.S. Application Data

(63) Continuation of application No. 16/664,711, filed on Oct. 25, 2019, now Pat. No. 11,380,100, which is a
(Continued)

(51) Int. Cl.
G06V 20/40 (2022.01)
G06K 9/62 (2022.01)
(Continued)

(52) U.S. Cl.
CPC ............. G06V 20/42 (2022.01); G06K 9/627 (2013.01); G06N 20/00 (2019.01); G06Q 50/00 (2013.01);
(Continued)

(58) Field of Classification Search
CPC .............. G06K 9/00724; G06K 9/627; G06K 9/00342; G06T 7/20
See application file for complete search history.

(56) References Cited

U.S. PATENT DOCUMENTS 6,389,368 B1 *  5/2002  Hampton ............. G01B 5/0023
                                                         473/480
7,094,164 B2    8/2006  Marty et al.
(Continued)

OTHER PUBLICATIONS

Min XU, et al., "Event Detection in Basketball Video Using Multiple Modalities," ICICS-PCM 2003, Dec. 15-18, 2003, IEEE, Singapore.
(Continued)

Primary Examiner — Bobbak Safaipour
(74) Attorney, Agent, or Firm — American Patent Agency PC; Daniar Hussain

(57) ABSTRACT

Methods and systems for determining a ball shot attempt location on a ball court are disclosed. The method includes receiving an input video, where the input video includes the ball shot attempt and one or more players; receiving a declared ball shot attempt; determining a potential shooter by detecting a moving object flow in the input video; determining a potential shooter image region in the image plane by analyzing an overlapping image area of the ball trajectory and the potential shooter; determining a shooter foot-on-court time; determining a most probable pair of shooter legs in the potential shooter image region; determining a shooter foot location based on the most probable pair of shooter legs; and determining a ball shot attempt location on the ball court by applying a camera projection to the shooter foot location.

20 Claims, 32 Drawing Sheets

Related U.S. Application Data continuation of application No. 16/109,923, filed on Aug. 23, 2018, now Pat. No. 10,489,656.

(60) Provisional application No. 62/631,865, filed on Feb. 18, 2018, provisional application No. 62/561,461, filed on Sep. 21, 2017.

(51) Int. Cl.

| | |
|---|---|
| *G06N 20/00* | (2019.01) |
| *G06Q 50/00* | (2012.01) |
| *G06T 7/11* | (2017.01) |
| *G06T 7/20* | (2017.01) |
| *G06V 10/25* | (2022.01) |
| *G06V 10/40* | (2022.01) |
| *G06V 10/44* | (2022.01) |
| *G06V 40/20* | (2022.01) |
| *G11B 27/00* | (2006.01) |
| *G06N 3/08* | (2006.01) |
| *G06V 10/764* | (2022.01) |
| *G06V 10/82* | (2022.01) |
| *G06N 3/04* | (2023.01) |

(52) U.S. Cl.
CPC .............. *G06T 7/11* (2017.01); *G06T 7/20* (2013.01); *G06V 10/25* (2022.01); *G06V 10/40* (2022.01); *G06V 10/454* (2022.01); *G06V 40/23* (2022.01); *G11B 27/00* (2013.01); *G06N 3/0454* (2013.01); *G06N 3/08* (2013.01); *G06T 2207/30224* (2013.01); *G06T 2207/30241* (2013.01)

(56) References Cited

U.S. PATENT DOCUMENTS

| | | | | |
|---|---|---|---|---|
| 7,613,324 | B2* | 11/2009 | Venetianer | G06V 20/52 382/103 |
| 8,306,390 | B2* | 11/2012 | Yoshikawa | H04N 5/147 386/223 |
| 8,845,460 | B1* | 9/2014 | Feldstein | A63B 69/0071 473/433 |
| 9,254,432 | B2 | 2/2016 | Ianni et al. | |
| 9,275,470 | B1* | 3/2016 | Forkosh | G06T 11/60 |
| 9,474,953 | B1* | 10/2016 | Duke | A63B 69/0071 |
| 10,159,884 | B2* | 12/2018 | Thurman | A63B 43/06 |
| 10,712,901 | B2* | 7/2020 | Hwang | G06F 3/011 |
| 11,135,500 | B1* | 10/2021 | Campbell | A63B 63/083 |
| 11,380,100 | B2* | 7/2022 | Lee | G06N 20/00 |
| 2003/0053659 | A1* | 3/2003 | Pavlidis | G06V 40/20 382/103 |
| 2006/0204045 | A1* | 9/2006 | Antonucci | G06T 11/206 382/103 |
| 2007/0155493 | A1* | 7/2007 | Sata | A63F 13/52 463/33 |
| 2008/0312010 | A1* | 12/2008 | Marty | G06T 7/20 73/865.4 |
| 2009/0060321 | A1* | 3/2009 | Gillard | G06T 17/00 382/154 |
| 2010/0210377 | A1* | 8/2010 | Lock | A63B 69/3658 473/409 |
| 2010/0248830 | A1* | 9/2010 | Otomo | A63F 13/55 463/31 |
| 2011/0231428 | A1* | 9/2011 | Kuramura | G06Q 30/00 707/769 |
| 2012/0289296 | A1* | 11/2012 | Marty | G06T 13/20 463/3 |
| 2013/0058532 | A1* | 3/2013 | White | A63B 24/0003 382/103 |
| 2013/0095960 | A9* | 4/2013 | Marty | G06T 7/70 473/447 |
| 2013/0095961 | A1* | 4/2013 | Marty | A63B 24/0084 473/450 |
| 2014/0180451 | A1* | 6/2014 | Marty | A63B 24/0084 700/91 |
| 2014/0195019 | A1* | 7/2014 | Thurman | A63B 41/02 700/91 |
| 2014/0222177 | A1* | 8/2014 | Thurman | A63B 41/02 700/92 |
| 2015/0131845 | A1* | 5/2015 | Forouhar | G06F 16/7837 382/100 |
| 2015/0145728 | A1* | 5/2015 | Addison | G01S 5/14 342/465 |
| 2016/0096067 | A1* | 4/2016 | Ianni | A63B 69/0071 473/447 |
| 2016/0096071 | A1* | 4/2016 | Ianni | A63B 71/0605 700/91 |
| 2016/0279498 | A1* | 9/2016 | Gordon | A63B 71/0619 |
| 2016/0339297 | A1* | 11/2016 | Hohteri | G06V 20/00 |
| 2017/0116788 | A1* | 4/2017 | Chenglei | A63F 13/25 |
| 2017/0132470 | A1* | 5/2017 | Sasaki | G06T 15/30 |
| 2017/0134644 | A1* | 5/2017 | Ueda | G06V 20/42 |
| 2017/0154222 | A1* | 6/2017 | Zakaluk | G06T 7/277 |
| 2018/0032846 | A1* | 2/2018 | Yang | G06N 3/04 |
| 2018/0056124 | A1* | 3/2018 | Marty | A63B 69/0071 |
| 2018/0082428 | A1* | 3/2018 | Leung | G06T 7/11 |
| 2018/0147468 | A1* | 5/2018 | Gordon | G09B 19/0038 |
| 2018/0189971 | A1 | 7/2018 | Hildreth | |
| 2018/0218243 | A1* | 8/2018 | Felsen | G06N 7/005 |
| 2018/0290019 | A1* | 10/2018 | Rahimi | G06T 7/262 |
| 2018/0293736 | A1* | 10/2018 | Rahimi | G06T 7/246 |
| 2018/0322337 | A1* | 11/2018 | Marty | G06T 7/20 |
| 2019/0076713 | A1* | 3/2019 | Cuenin | G07C 1/22 |
| 2019/0087661 | A1* | 3/2019 | Lee | G06V 10/25 |
| 2019/0176012 | A1* | 6/2019 | Ianni | A63B 71/0669 |
| 2019/0180448 | A1* | 6/2019 | Ro | G06T 7/246 |
| 2019/0209080 | A1* | 7/2019 | Gullotti | A61B 17/7076 |
| 2019/0282905 | A1* | 9/2019 | Oshino | A63F 13/57 |
| 2019/0294882 | A1* | 9/2019 | Ackland | G06K 9/627 |
| 2019/0329114 | A1* | 10/2019 | Marty | A63B 24/0021 |
| 2019/0366153 | A1* | 12/2019 | Zhang | A63B 24/0062 |
| 2019/0392729 | A1* | 12/2019 | Lee | G06V 10/82 |
| 2020/0034628 | A1* | 1/2020 | Chen | G06T 7/248 |
| 2020/0043287 | A1* | 2/2020 | Zhang | A63F 13/812 |
| 2020/0098113 | A1* | 3/2020 | Marty | A63B 69/00 |
| 2020/0298080 | A1* | 9/2020 | Zhang | G06T 7/20 |
| 2021/0146220 | A1* | 5/2021 | Hall | A63B 71/0622 |
| 2022/0238036 | A1* | 7/2022 | Lee | G06V 10/82 |

OTHER PUBLICATIONS

Wei-Lwun Lu, et al., "Learning to Track and Identify Players from Broadcast Sports Videos," IEEE Transactions on Pattern Analysis and Machine Intelligence 35 (7), Jul. 2013.

Yun Liu, et al., "A New Method for Shot Identification in Basketball Video," Journal of Software 6 (8), Aug. 2011, DOI 10.4304/jsw.6.8.1468-1475.

Hua-Tsung Chen, et al., "Physics-based ball tracking and 3D trajectory reconstruction with applications to shooting location estimation in basketball video," J. Vis. Commun. Image R., 20 (3): 204-216, 2009, DOI 10.1016/j.jvcir.2008.11.008.

Francesco Cricri, et al., "Salient Event Detection in Basketball Mobile Videos," Proc. IEEE Int'l Symp. Multimedia, 2014, pp. 63-70, DOI 10.1109/ISM.2014.67.

Roland Leser, et al., "Local Positioning Systems in (Game) Sports," Sensors 2011, 11, 9778-9797, DOI 10.3390/sl 11009778.

Huang-Chia Shih, "A Survey on Content-aware Video Analysis for Sports," IEEE Transactions on Circuits and Systems for Video Technology 99 (9), Jan. 2017.

Vikedo Terhuja, "Automatic Detection of Possessions and Shots from Raw Basketball Videos," Master's Thesis, Presented Dec. 3, 2015, Oregon State University, US.

Standz by Zepp, Last accessed Aug. 13, 2018 Available at http://gadgetsandwearables.com/2017/05/30/zepp-basketball/ and at http://www.zepp.com/en-us/standz/.

Noah Basketball (NOAHLytics/MyNoah V3), Last accessed Aug. 13, 2018 Available at http://www.noahbasketball.com.

(56) References Cited

OTHER PUBLICATIONS

Hoop Tracker, Last accessed Aug. 13, 2018, Available at https://www.youtube.com/watch?v=HS9VYIzJsyl.
ShotTracker, Last accessed Aug. 13, 2018, Available at http://www.spongecoach.com/best-basketball-training-app/.
Wilson Smart Basketball, Last accessed Aug. 13, 2018, Available at https://www.theverge.com/2015/9/17/9347039/wilson-x-connected-smart-basketball.

* cited by examiner

900

| Explore |
|---|

| Leaderboards | Players |
|---|---|

Longest 3PT streak
Longest streak of made threes in a session

🏅 1st Place   Isaac White   25

Longest FT streak
Longest streak of made free throws in a session

🏅 1st Place   Colin Wan   54

Longest overall streak
Longest streak of made shots made in a session

🏅 1st Place   Colin Wan   54

Best 25 3PT shots
Most makes in a 25 shot three point sequence

🏅 1st Place   Michael Humphrey   25

Best 25 PT shots
Most makes in a 25 shot free throw sequence

FIG. 9

○ COMPUTED 3D COORDINATES OF BALLS
× FITTED FREE-FALL QUADRATIC CURVE

2200
ILLUSTRATION 2220
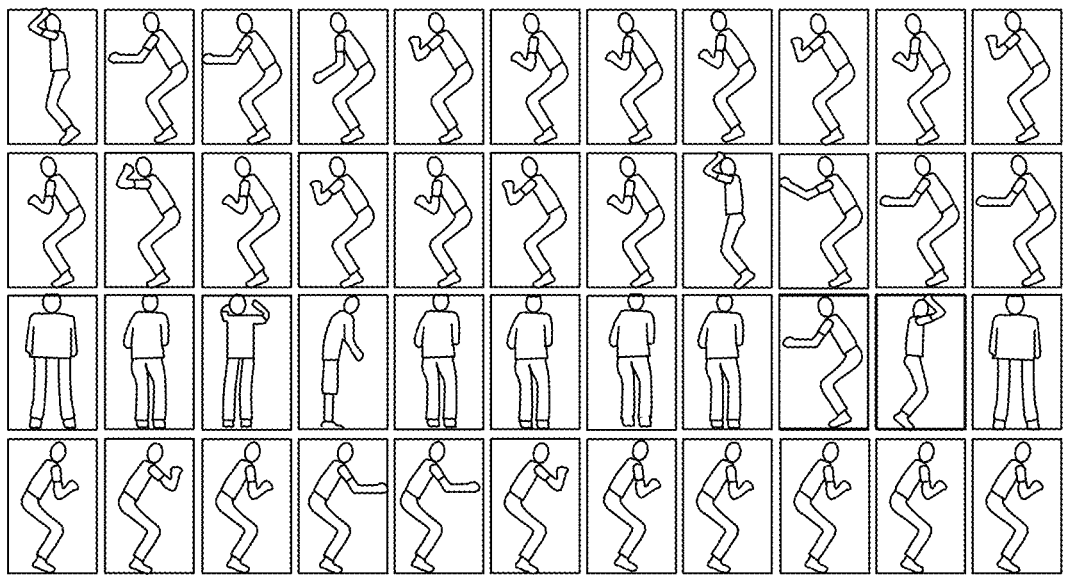
2240 2260
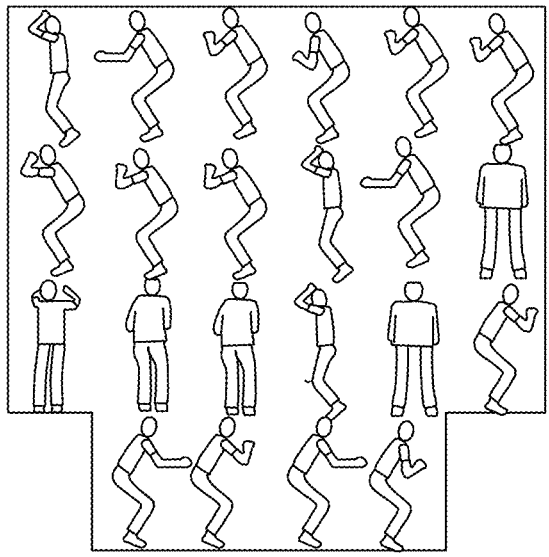 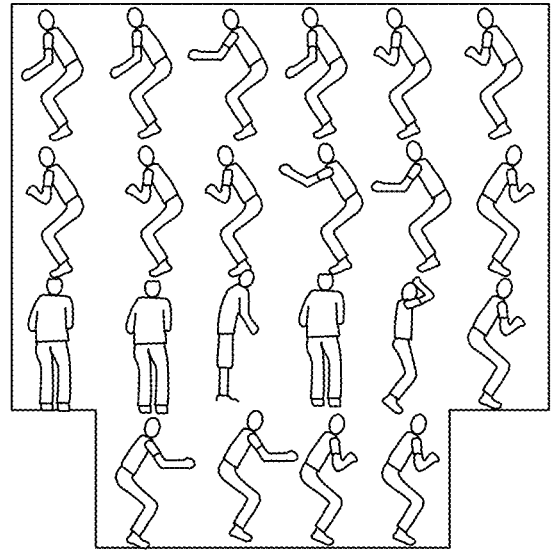
FIG. 22

METHODS AND SYSTEMS FOR DETERMINING BALL SHOT ATTEMPT LOCATION ON BALL COURT

REFERENCE TO RELATED APPLICATIONS

If an Application Data Sheet (ADS) has been filed on the filing date of this application, it is incorporated by reference herein. Any applications claimed on the ADS for priority under 35 U.S.C. §§ 119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

NOTICE OF COPYRIGHTS AND TRADEDRESS

A portion of the disclosure of this patent document contains material which is subject to copyright protection. This patent document may show and/or describe matter which is or may become tradedress of the owner. The copyright and tradedress owner has no objection to the facsimile reproduction by anyone of the patent disclosure as it appears in the U.S. Patent and Trademark Office files or records, but otherwise reserves all copyright and tradedress rights whatsoever.

FIELD OF THE INVENTION

Embodiments of the present invention are in the field of sports analysis, and pertain particularly to methods and systems for generating analytics of ball shots and games with a mobile device having a camera for game capturing.

BACKGROUND OF THE INVENTION

The statements in this section may serve as a background to help understand the invention and its application and uses, but may not constitute prior art.

Modern computing technology has brought in a new era of rapid real-time analysis of sports activities. Whether it's a viewer watching a game for leisure, a coach analyzing plays to adapt to the opposing team's strategy, or a general manager compiling data sets across multiple games to optimize player retention strategies, real-time analysis enables thorough quantitative game analysis by granting the viewer instantaneous access to statistical data of every single play. Sport analytics have seen uses in applications such as broadcasting, game strategizing, and team management, yet real-time analytic systems for mass mainstream usage is still complex and expensive. Real-time tracking technology based on image recognition often requires use of multiple high-definition cameras mounted on top of a game area or play field for capturing visual data from multiple camera arrays positioned at multiple perspectives, calibration for different environments, and massive processing power in high-end desktop and/or server-grade hardware to analyze the data from the camera arrays. Accurate tracking of key events throughout the game, such as identifying key players involved in point or shot attempts, identifying location of such attempts, and recognizing the results of such attempts, requires vast resources including expensive equipment with complicated setups that prevent mass adaptation of both real-time and off-line sports analytic systems implemented with low-cost, general-purpose hardware having small form factors.

Therefore, in view of the aforementioned difficulties, there is an unsolved need to easily and accurately detect key events in ball game plays including individual practices and team games, to track relevant shot attempts and locations, identify the ball and players, understand their motions, generate play analytics, and provide relevant tracking and analytical results to viewers in an efficient manner. In addition, it would be an advancement in the state of the art of ball shot and game play analysis to render real-time game plays with high visual fidelity, and to automatically understand different ball courts and perform self-calibration with minimal user input, while maintaining minimal delay and data transfer overheads, such that the entire system can be implemented on a single mobile computing device, such as a smartphone or a tablet.

It is against this background that various embodiments of the present invention were developed.

BRIEF SUMMARY OF THE INVENTION

Methods and systems are provided for mobile device-based real-time detection, analysis and recording of ball shot attempts, player identification, and game analytics. The method includes, but is not limited to, the steps of detecting a shot attempt, identifying how the attempt was made and the result of the attempt, identifying the shooting location, identifying players involved in the shot attempt, and recording the attempt in a video that may be re-played.

More specifically, in one aspect, one embodiment of the present invention is a method for detecting a ball shot attempt, comprising the steps of receiving an input video of a ball gameplay, wherein the input video was captured using a stationary camera, and wherein frames of the input video comprises a goal; identifying a Region of Interest (ROI) surrounding the goal by performing a first computer vision algorithm on the input video; detecting a ball within the ROI during a shot attempt and determining a trajectory of the ball by performing a second computer vision algorithm on the input video; and identifying a player relevant to the shot attempt based on the trajectory of the ball.

In some embodiments, the method further comprises detecting a foot location of the player before the shot is taken.

In some embodiments, the input video is captured in real-time.

In some embodiments, the determining of the trajectory of the ball is by backtracking the ball over a time duration. In some embodiments, the time duration is 2 seconds. In some embodiments, the input video over the time duration is down-sampled.

In some embodiments, the trajectory of the ball is selected from the group consisting of a two-dimensional trajectory, and a three-dimensional trajectory.

In some embodiments, the stationary camera is located on a mobile user-device.

In some embodiments, at least one of the first and the second computer vision algorithms comprises a convolution neural network (CNN).

In some embodiments, the ball gameplay is a basketball game, and the method further comprises identifying four point-boundaries of a basketball court. In some embodiments, the method further comprises identifying a center of a free-throw line.

In some embodiments, the method further comprises determining at least one shot attempt result, and generating a game analytics based on the at least one shot attempt result. In some embodiments, the method further comprises generating the game analytics based on the at least one shot attempt result and the foot location of the player.

In another aspect, another embodiment of the present invention is a system for detecting a ball shot attempt, comprising at least one processor, and a non-transitory physical medium for storing program code and accessible by the processor, the program code when executed by the processor causes the processor to receive an input video of a ball gameplay, wherein the input video was captured using a stationary camera, and wherein frames of the input video comprises a goal; identify a Region of Interest (ROI) surrounding the goal by performing a first computer vision algorithm on the input video; detect a ball within the ROI during a shot attempt and determine a trajectory of the ball by performing a second computer vision algorithm on the input video; and identify a player relevant to the shot attempt based on the trajectory of the ball.

In yet another aspect, yet another embodiment of the present invention is a non-transitory computer-readable storage medium for a ball shot attempt, the storage medium comprising program code stored thereon, that when executed by a processor causes the processor to receive an input video of a ball gameplay, wherein the input video was captured using a stationary camera, and wherein frames of the input video comprises a goal; identify a Region of Interest (ROI) surrounding the goal by performing a first computer vision algorithm on the input video; detect a ball within the ROI during a shot attempt and determine a trajectory of the ball by performing a second computer vision algorithm on the input video; and identify a player relevant to the shot attempt based on the trajectory of the ball.

Yet other aspects of the present invention include methods, processes, and algorithms comprising the steps described herein, and also include the processes and modes of operation of the systems and servers described herein. Other aspects and embodiments of the present invention will become apparent from the detailed description of the invention when read in conjunction with the attached drawings.

BRIEF DESCRIPTION OF THE DRAWINGS

Embodiments of the present invention described herein are exemplary, and not restrictive. Embodiments will now be described, by way of examples, with reference to the accompanying drawings, in which:

FIG. 9 is a screen capture of a leaderboard showing best performances among multiple players, according to one embodiment of the present invention.

FIG. 22 is a diagram showing exemplary player clusters for player identification, according to some embodiments of the present invention.

DETAILED DESCRIPTION OF THE INVENTION

Figure 1:
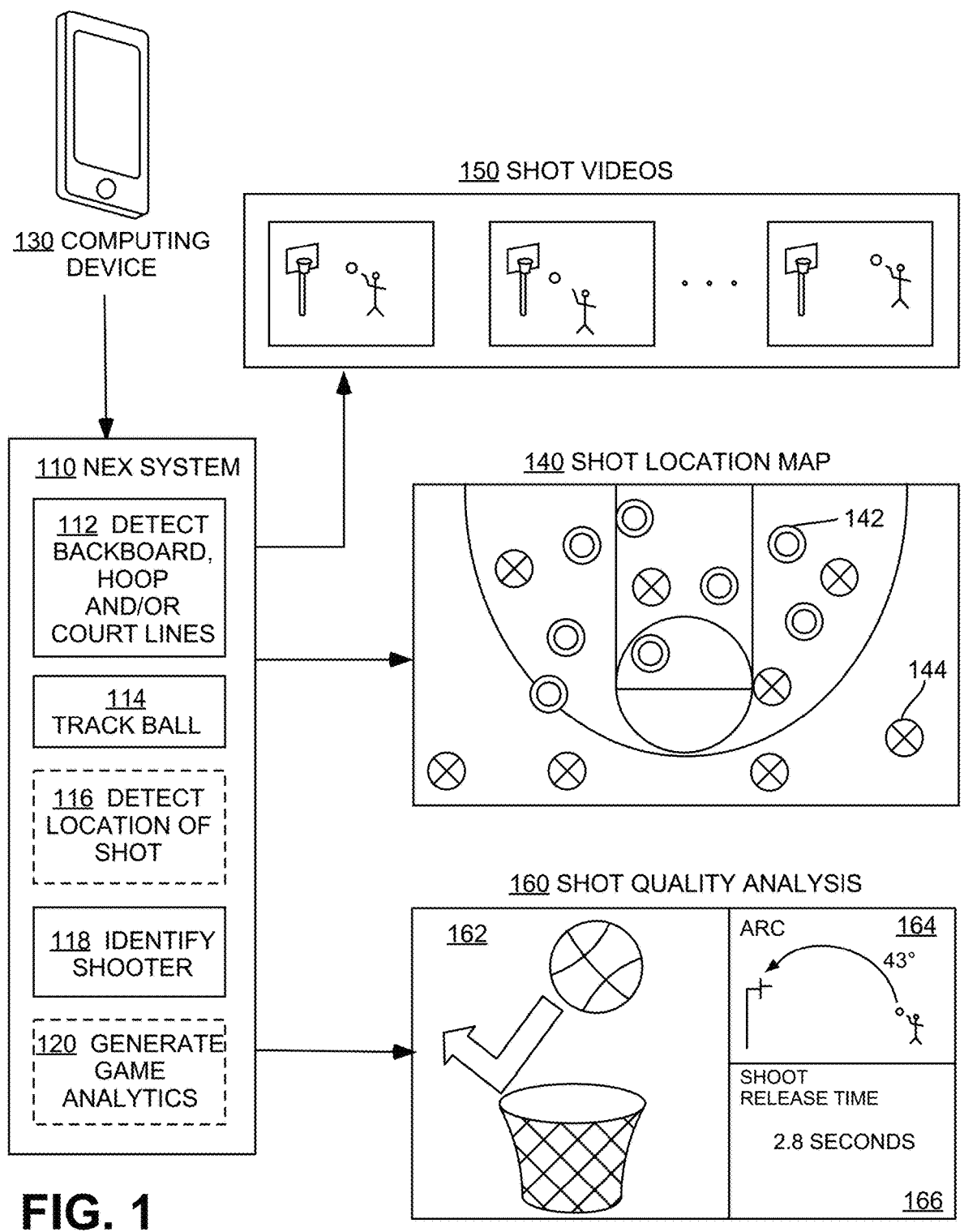
FIG. 1 is an architectural overview of a mobile device-based system used to generate game recordings and game analytics, according to one embodiment of the present invention.

In the following description, for purposes of explanation, numerous specific details are set forth in order to provide a thorough understanding of the invention. It will be apparent, however, to one skilled in the art that the invention can be practiced without these specific details. In other instances, structures, devices, activities, and methods are shown using schematics, use cases, and/or flow diagrams in order to avoid obscuring the invention. Although the following description contains many specifics for the purposes of illustration, anyone skilled in the art will appreciate that many variations and/or alterations to suggested details are within the scope of the present invention. Similarly, although many of the features of the present invention are described in terms of each other, or in conjunction with each other, one skilled in the art will appreciate that many of these features can be provided independently of other features. Accordingly, this description of the invention is set forth without any loss of generality to, and without imposing limitations upon the invention.

Broadly, embodiments of the present invention relate to real-time analysis of sports games, and pertain particularly to methods and systems for ball game analysis using personal computing devices, such as smartphones and tablets. It would be understood by persons of ordinary skill in the art that the terms "game" and "game play" in this disclosure refer to not only competitive activities involving opposing teams, but also individual and group practice or drilling activities. In other words, embodiments of the present invention may be used for capturing and analyzing shot attempts and other aspects of ball sport activities, as long as there is at least one player present on the play field being recorded. In addition, it would be clear to one of ordinary skill in the art that embodiments of the present invention may also be applied to soccer, baseball, football, hockey, and many other types of ball sports, where a "goal" refers to an area, basket, or other structure towards or into which players attempt to throw or drive a ball, puck, or a similar object to score points.

More specifically, embodiments of the present invention relate to identifying a shot attempt, identify a player making the shot attempt, recognizing the player's pose, recording a location and result of the shot attempt, tracking a trajectory of the shot attempt, marking a foot position of the player making the shot attempt on a bird-eye view of the basketball court, and providing contextual video playback experience afterward, with other statistics and analytics relevant to the basketball game play, all by a computing device, such as smartphone. Each step of the game analysis processes as disclosed herein may be performed in real-time or in an off-line fashion, automatically or upon user request. In some embodiments, one or more of the steps are optional.

Unlike conventional computer vision-based real-time sports analysis systems that require several high-resolution cameras mounted on top of or sidelines of a ball field and the use of high-end desktop or server hardware, embodiments of the present invention allow users to perform real-time analysis of ball sport games with a single mobile device such as a smartphone, a tablet, a laptop, or smart glasses. In various embodiments, computer vision techniques such as image registration, motion detection, background subtraction, object tracking, 3D reconstruction techniques, cluster analysis techniques, camera calibration techniques such as camera pose estimation and sensor fusion, and modern machine learning techniques such as convolutional neural network (CNN), are selectively combined to perform high accuracy analysis in real-time on a mobile device. The limited computational resources in a mobile device present a very unique challenge. For instance, a smartphone's limited CPU processing power is heat-sensitive. CPU clock rate is reduced by the operating system (OS) whenever the phone heats up. Also, when a system consumes too much memory, it can get killed by the OS. It is also important to be mindful of how much battery the analytics system consumes, otherwise the limited battery on a smartphone may not even last a whole game.

The mobility of and flexibility in mounting a mobile device enables capturing a shot from any angle. Embodiments of the present invention can be used in different ball courts or fields, indoor or outdoor setting, under varying lighting conditions. Embodiments of the present invention may also be able to understand any typical ball court with minimal or no user input, support flexible placement of the mobile device, and be resilient to vibration or accidental movements.

NEX, NEX TEAM, and HOMECOURT are trademark names carrying embodiments of the present invention, and hence, the aforementioned trademark names may be interchangeably used in the specification and drawing to refer to the products/services offered by embodiments of the present invention. The term NEX, NEX TEAM, or HOMECOURT may be used in this specification to describe the overall game video capturing and analytics generation platform, as well as the company providing said platform. With reference to the figures, embodiments of the present invention are now described in detail.

Overview

FIG. 1 shows a schematic diagram 100 for practicing one embodiment of the present invention. More specifically, FIG. 1 is an architectural overview of a computing device-based system for generating game recordings and game analytics. A computing device 130 comprises at least one camera for capturing various image and video footage 150 of game actions, and may implement a NEX system 110 for generating game analytics such as a shot location map 140 and shot analytics 160. Exemplary computing devices include, but are not limited to, dedicated or general-purpose hardware, desktop computers, and mobile devices such as smartphones, tablets, laptops, smart watches, and the like. In some embodiments, computing device 130 is used for image capturing alone, such as with a point-and-shoot camera or a high-end single-lens reflex camera, while NEX system 110 is implemented separately in a connected hardware system. In other words, NEX system 110 may be implemented directly on computing device 130, or may be implemented in software or hardware connected to computing device 130. In some embodiments, NEX system 110 is a distributed system, where detection, tracking, and analysis services such as 112, 114, 116, 118, and 120 are implemented on physically or logically separate devices. In some embodiments, one or more portions of NEX system 110 may be hosted in the cloud. In yet some other embodiments, more than one instances of NEX system 110 may be networked, for example, to provide game analytics for a competitive game, where two mobile devices are utilized to capture two virtually or physically opposing goals and two halves of a ball court or to provide cross-verification of the analysis results and to facilitate opposing game plays.

Exemplary processes performed by NEX system 110 includes retrieving game recordings or shot videos 150 recorded by computing device 130 from local memory or from a remote database. Generally, "receipt," "retrieval," or "access" to or of a video recording refers to the actions of performing read and/or write operations to the saved video content in memory, with or without explicit graphical displays on a display device such as a touch screen. In some embodiments, NEX system 110 may also perform one or more of Step 112 detecting backboard, hoop, and/or court lines, Step 114 tracking one or more balls, optional Step 116 detecting shot location, Step 118 identifying a shooter, and Step 120 generating game analytics, where game analytics data may be based on shot attempt results and locations, and in the form of additional graphical and/or numerical data. In addition, NEX system 110 may split a game recording into per-shot segments of individual shot attempts (shown in FIG. 2), provide a bird-eye view 140 of the basketball court showing shot attempt locations derived from foot positions of players making the shot attempts, and perform shot quality analysis 160 including whether a shot has been a swish or not, a shot attempt result 162 on whether the shot attempt has been a make or a miss, miss reason, shot release time 166, and shot arc 164 at which the shot has been attempted.

Illustrative Analytics and Outputs

Without first getting into implementation details, this section provides a series of screen captures illustrating outputs that may be generated by various embodiment of the present invention, including game analytics, shot analytics, player-based statistics, and many others.

Figure 2:
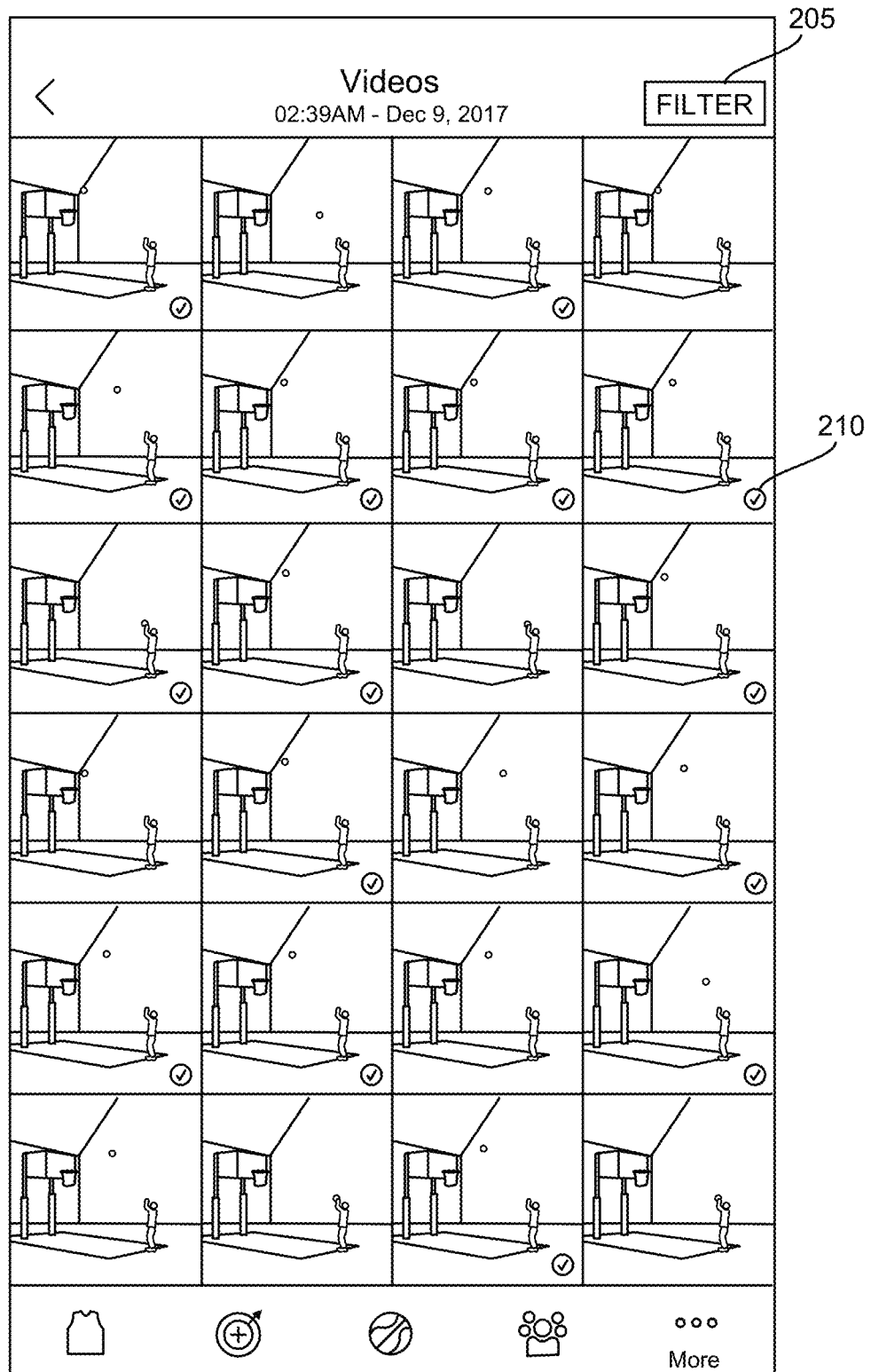
FIG. 2 is an exemplary list of videos of shot attempts, according to one embodiment of the present invention.

FIG. 2 is an exemplary list 200 of thumbnails or icons representing video clips or segments of individual basketball shot attempts detected by the NEX system, according to one embodiment of the present invention. In this disclosure, a shot attempt is the act of a player attempting to make a shot towards a field goal. For example, in FIG. 2, each shot attempt is the act of a player throwing a basketball towards a basketball hoop and thus attempting to make a shot. The result of a shot attempt may be a make or a miss, indicating a successful or unsuccessful shot. A successful shot attempt result may be combined with a detected foot location of the player making the shot attempt when the basketball left the player's hands to determine a score achieved by the shot. In other exemplary ball games such as a soccer game, a shot attempt is similarly the act by a player kicking or heading a soccer ball towards a net.

In some embodiments, each video segment includes only one identified shot attempt, obtained by analyzing a real-time or on-demand recording. The recording may be split into individual video clips each covering a duration from a player initiating a shot to when the result of the shot (make or miss) is identified. In some embodiments, the recording may be split into individual video clips covering a duration including one or more passes and a subsequent shot attempt made. In some embodiments, the list of video clips shown in FIG. 2 may be filtered, either during the clip generation process, or over the display screen via an icon 205, according to pre-defined or user-selected criteria such as player name, make or miss, player location when attempting the shot, free throws (FTs), three-point field goals (3PTs), rebounds (RBs) and the like. For example, in this embodiment, checkmarks such as 210 are shown at the right bottom corner of the thumbnail of each video clip to indicate whether a shot attempt has been successful. Similarly, abbreviations may be provided on each thumbnail to indicate the player making the shot attempt; the video clips may be ordered chronologically or in a user-specified order such as first by player then by shot attempt results or shot scores.

Figure 3:
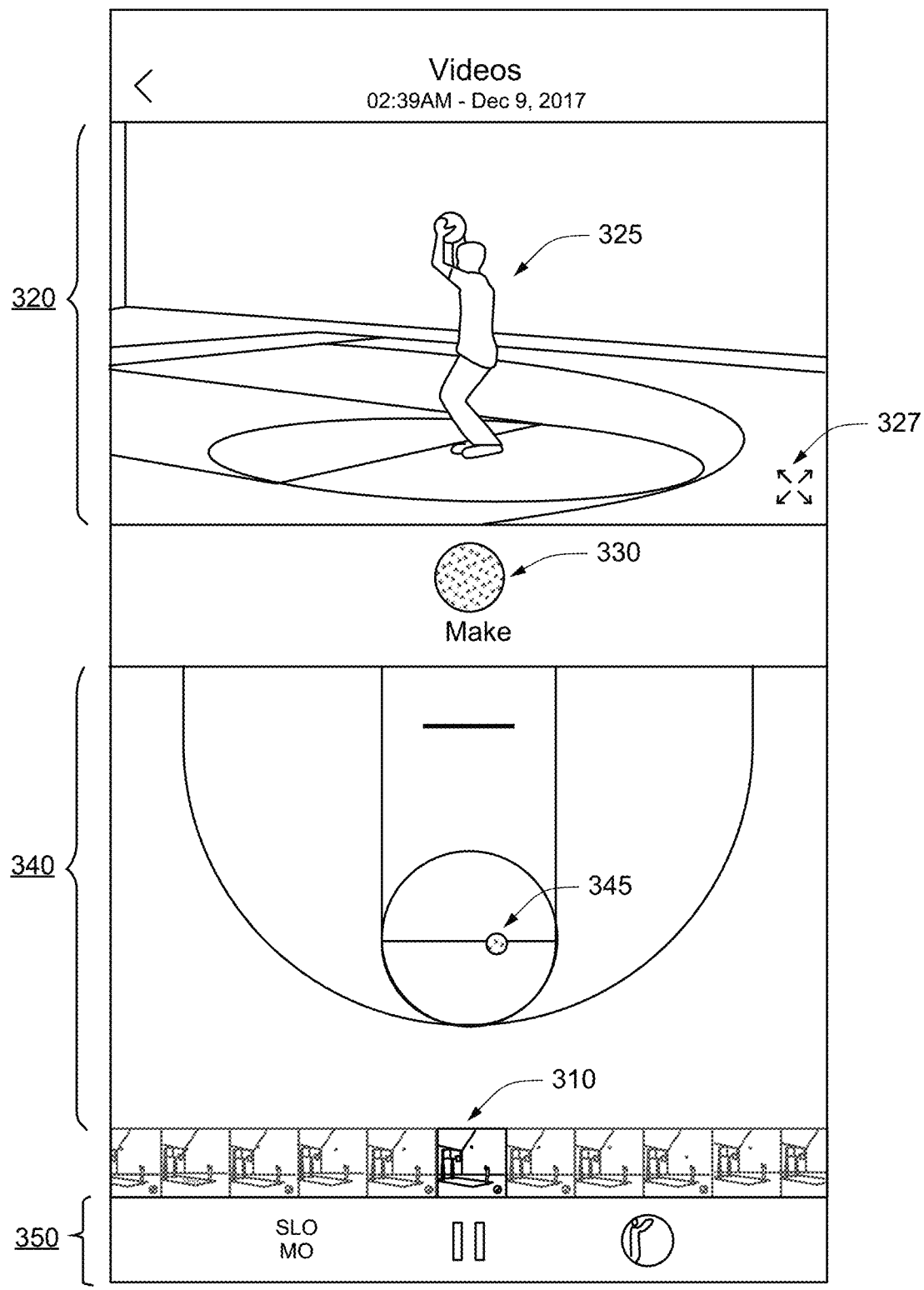
FIG. 3 shows a screen capture of an exemplary video of a successful shot attempt selected from the list in FIG. 2, according to one embodiment of the present invention.

FIG. 3 shows a screen capture 300 of an exemplary video clip 310 of a shot attempt selected from the list of video clips in FIG. 2, according to one embodiment of the present invention. With information such as shooter foot location and video segment trimming locations detected from an original input video recording, a per-shot attempt video playback experience with shooter-zoom and slow motion is made possible. Window 320 shows a view zoomed over a player 325, with a zoom control 327. The video clip may also be played, or paused, optionally in slow-motion via control icons shown in window 350. Based on collected make or miss information, a continuous shot streak video may also be generated, automatically or upon user request, where one or more dribbling, passing, and shot attempts may be included. In addition, in this example shown in FIG. 3, the shot attempt has been successful, as indicated by a circle 330. Foot position of the player when making the shot attempt is drawn correspondingly as a dot 345 on a bird-eye view diagram 340 of the court, relative to the court lines. In some embodiments, an unsuccessful or missed shot attempt may be labeled with a cross on the bird-eye view of the court.

Figure 4:
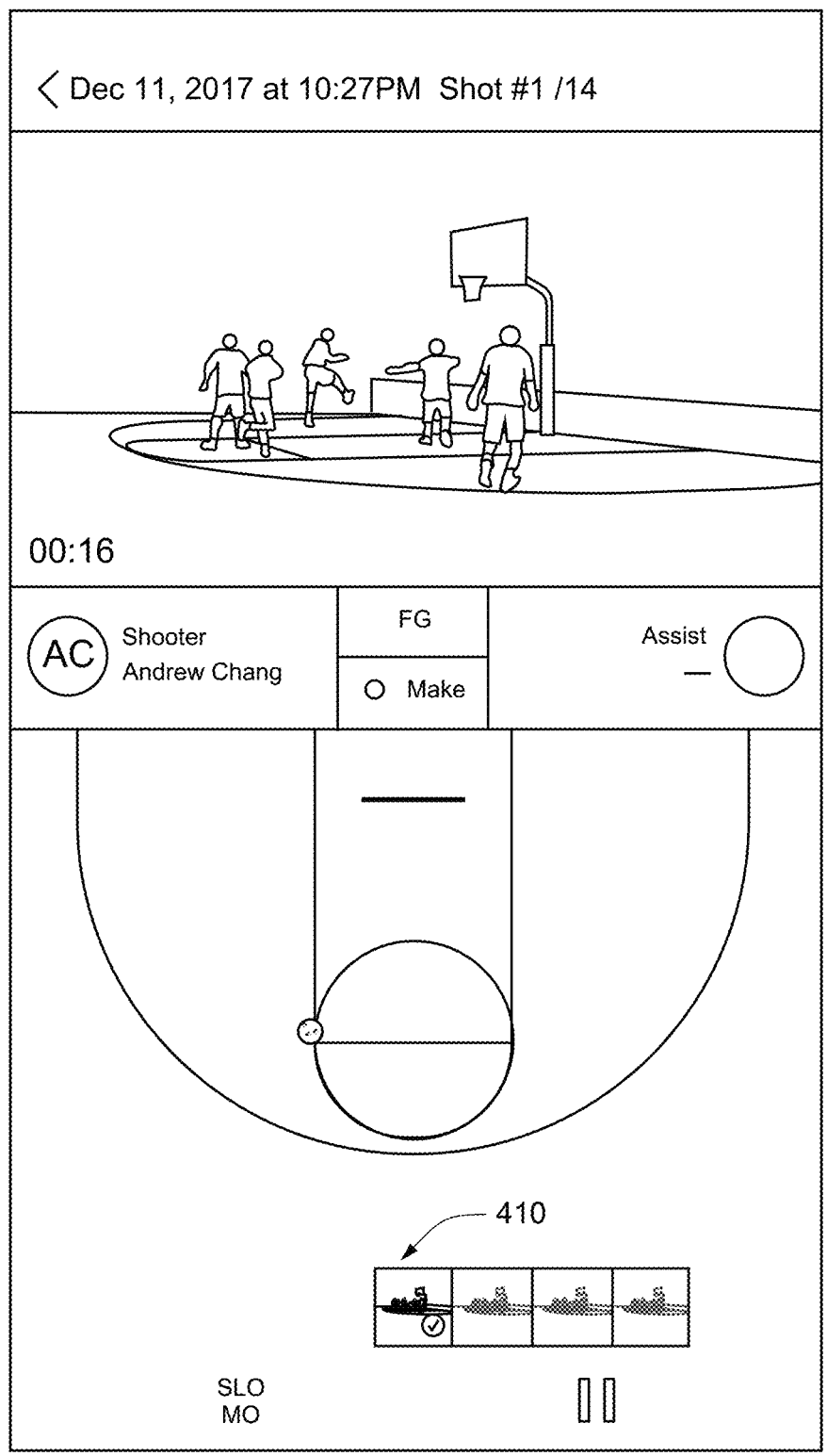
FIG. 4 is a screen capture showing an exemplary video of another successful shot attempt, according to one embodiment of the present invention.

Similarly, FIG. 4 is another screen capture 400 showing an exemplary video clip 410 of another successful shot attempt out of four shot attempts detected from an input video recording, according to one embodiment of the present invention. In this example, more than one player is present on the court. To distinguish the player who has made a detected shot attempt in the video clip, each player may be automatically identified based on player features such as facial features, poses, body sizes, shirt colors, jersey types and the like. More details of player identification and tracking processes are provided in reference to FIGS. 21 and 22. Alternatively, the NEX system may allow prior player name and/or feature input for one or more of the players, and each player may see his or her own practice statistics after a session. The NEX system may use information collected for each shot attempt to suggest statistics such as make or miss, shooter location, and shooter identity. In addition, a user may input other game features or statistics such as identities of the shooter, assister and rebounder, or for particular basketball positions such as point guard, forward, and center.

Figure 5:
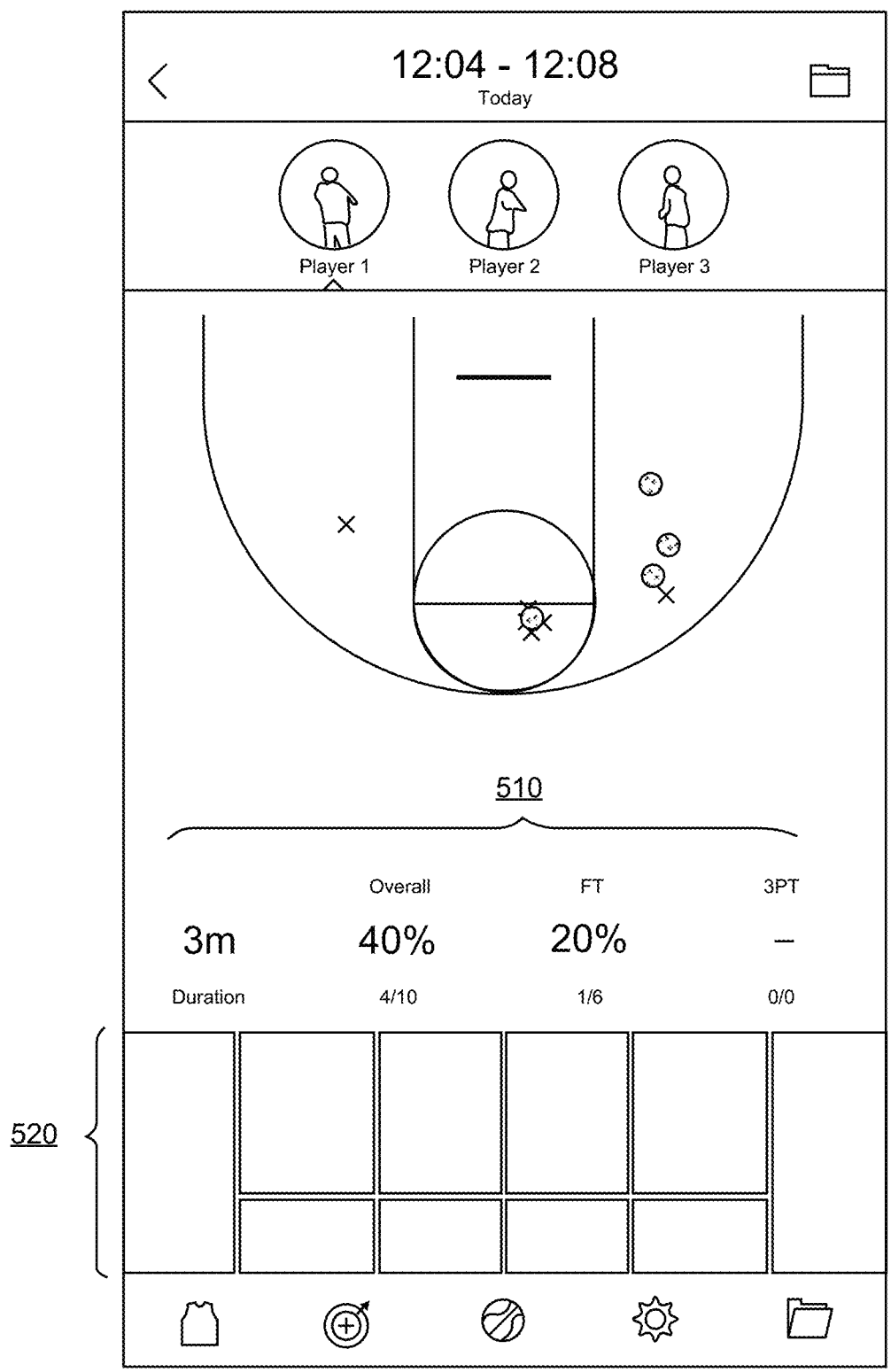
FIG. 5 is a screen capture of a result diagram showing game performance by a selected player, according to one embodiment of the present invention.

FIG. 5 is a screen capture 500 of a result chart showing game performance by a selected player, according to one embodiment of the present invention. In this example, three players have been identified, with Player 1 selected for result display. Locations of both made and missed shots have been drawn on the court diagram, using dots and crosses to indicate shot attempt results. In addition, make and miss statistics 510 are displayed, with 40% success over the entire duration of a 3-minute session, and 20% free throw success. In some embodiments, shot locations for different players may be displayed simultaneously, with each player labeled with a different color or marker shape. In addition, a bottom window 520 may display shot attempt result statistics in different regions of the basketball court.

Figure 6:
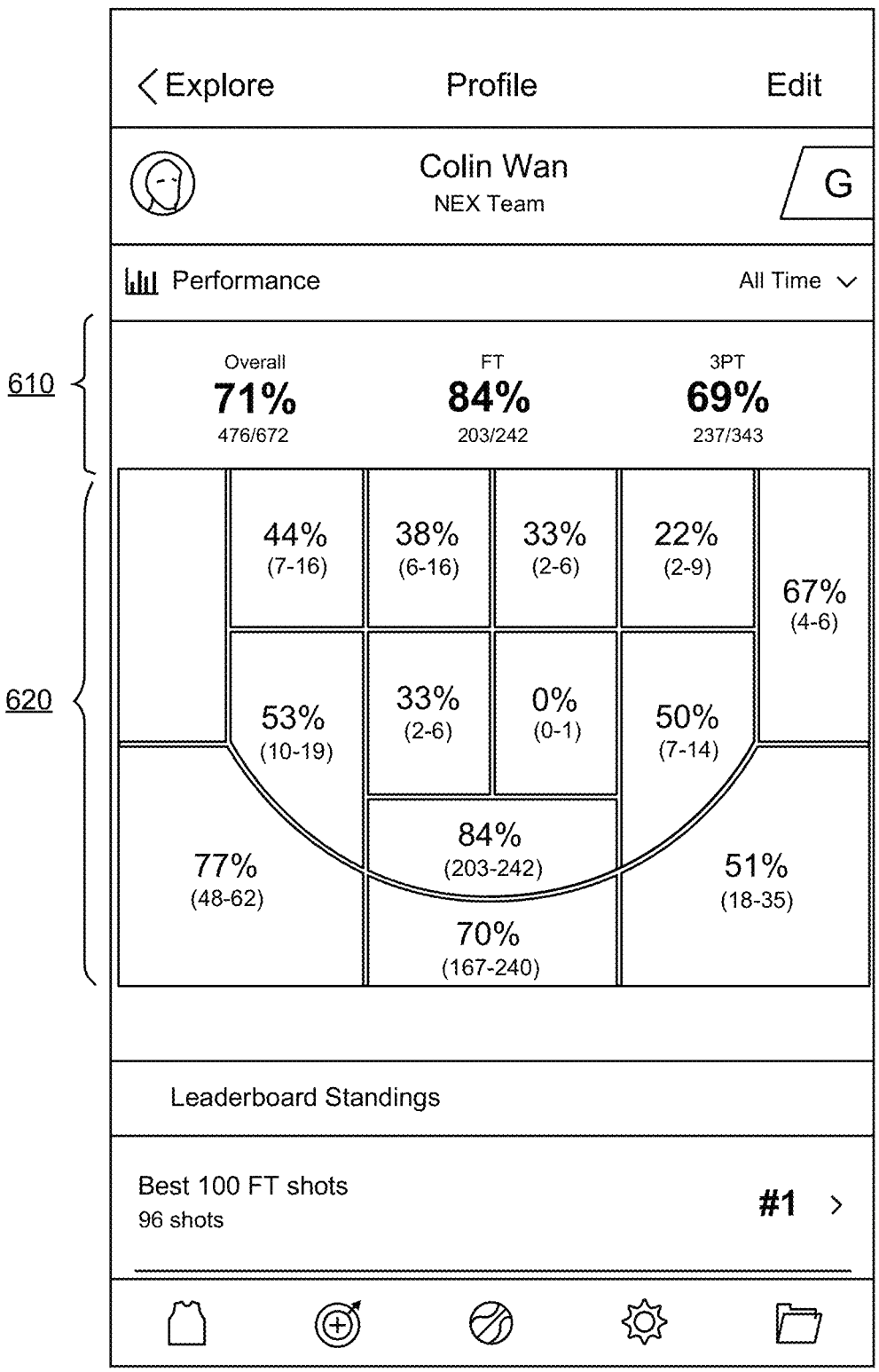
FIG. 6 is a screen capture of a detailed result chart and diagram showing game performance by a player, according to one embodiment of the present invention.

FIG. 6 is another screen capture 600 of a detailed result chart and diagram showing game performance by a player Colin Wan, according to one embodiment of the present invention. In this example, shot statistics or performance of the player Colin Wan collected over all time is displayed, both as total percentages 610, and within different areas on the court, as illustrated by window area 620, for example, to show various shot attempt success rates within each area.

Figure 7:
FIG. 7 is a screen capture of a detailed chart showing personal records by the player in FIG. 6, according to one embodiment of the present invention.

FIG. 7 is a screen capture 700 of an additional detailed chart showing personal records by the player Colin Wan, according to one embodiment of the present invention. In implementations on a mobile device such as a smartphone, game statistics may be displayed on the screen in a scrollable fashion, with FIG. 7 accessible by scrolling up FIG. 6.

Figure 8:
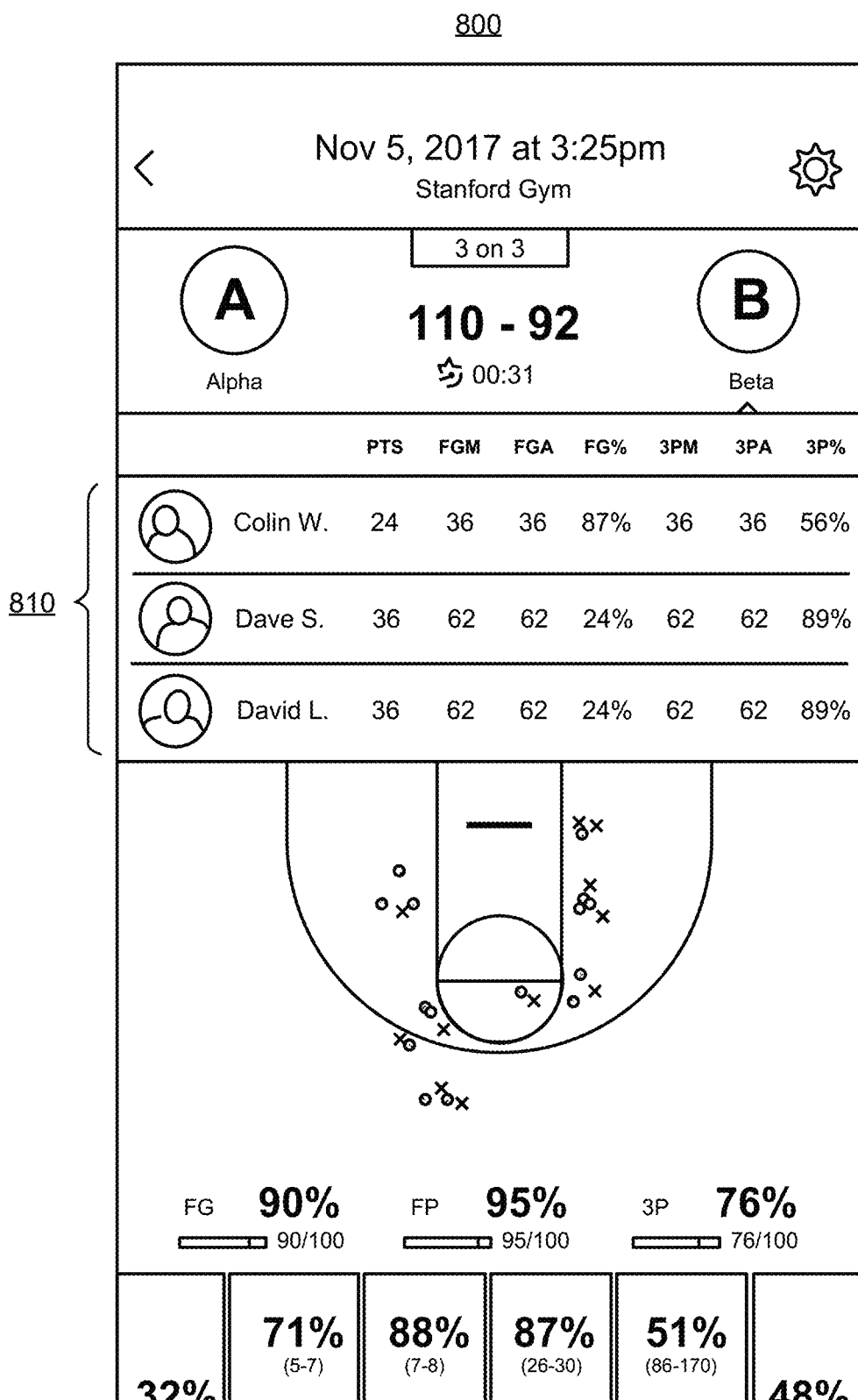
FIG. 8 is a screen capture of a result chart showing game performance by individual players of a team, according to one embodiment of the present invention.

FIG. 8 is a screen capture 800 of a result chart showing game performance by players of a team, according to one embodiment of the present invention. In this example, game scores are displayed on top for a three-on-three game, when 31 seconds remain in the game, and points collected by individual players of the Beta team are displayed in a tabular window 810. With one or both manual input and automatically detected statistics, the NEX system constructs aggregated statistics at game, team and player levels. Game highlight video with only shot attempts may also be generated on a per game and per player basis. Results and statistics as displayed in FIG. 8 may be live updated as a game is in progress, and a user may optionally choose to view such a live result screen rather than the video capture screen, such as shown in FIGS. 25-29.

FIG. 9 is a screen capture 900 of leaderboards showing best performances among multiple players, according to one embodiment of the present invention. In this example, the displayed statistics are collected over multiple shooting practice or competitive game sessions.

NEX System Architecture

This section provides implementation details of the NEX system, according to various exemplary embodiment of the present invention.

Figure 10:
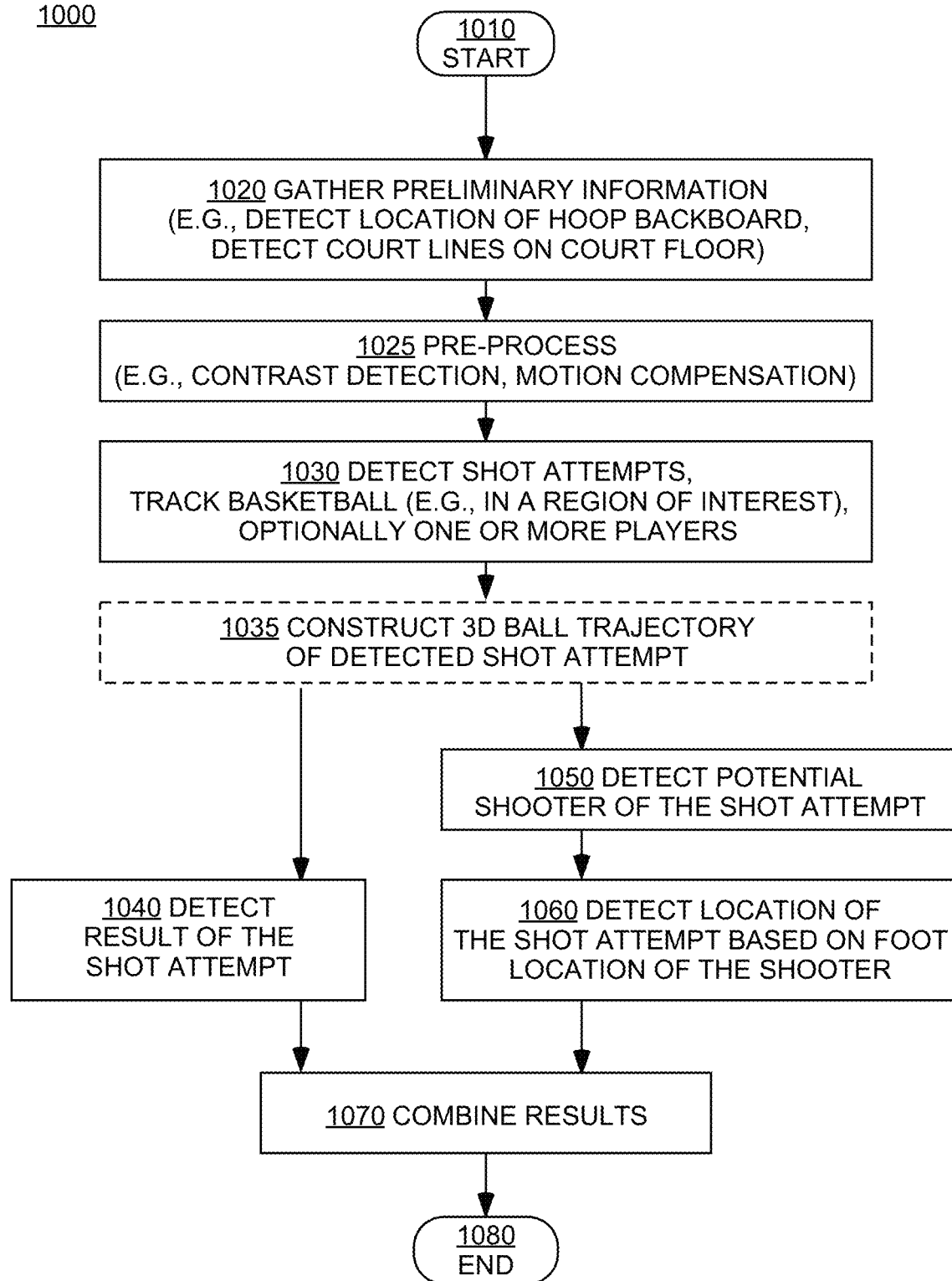
FIG. 10 is a flow diagram of a process for detection and analysis of basketball shot attempts, according to one embodiment of the present invention.

FIG. 10 is a flow diagram 1000 of a process for detection and analysis of basketball shot attempts, according to one embodiment of the present invention. FIG. 10 illustrates individual steps in an exemplary process for identifying and classifying shot attempts, and identifying shooters and corresponding shot attempt foot location, optionally by constructing a 3D ball trajectory. The process begins at step 1010. In this illustrative example, a basketball game played on a basketball court is considered. In other embodiments of the present invention, similar processes may be performed on other ball games such as a soccer game on a soccer field. In addition, the basketball court may be of standard size, or customized size, with or without full court lines.

At step 1020, from an input video or image recording of a ball gameplay, captured through a mobile device, the system first gathers preliminary information for further analysis and shot attempt detection. In some embodiments, the mobile device and a camera situated therein remain stationary during the video capturing process. For example, a tripod may be used, or the mobile device may be handheld, where motion compensation may be applied to the video recording to reduce minor motion effects such as blur and jitter. In some embodiments, the mobile device and camera situated therein may be non-stationary, by moving through a trajectory during the video capturing process to capture more than one perspective of the gameplay scene. In either case, some or all frames of the input video may comprise a goal, which refers to an area, basket, or other structure towards or into which players attempt to throw or drive a ball, puck, or a similar object to score points.

In some embodiments, the NEX system identifies a Region of Interest (ROI) surrounding the goal by performing a first computer vision algorithm on the input video. For example, the NEX system may first detect multiple feature points relevant to understanding the geometries of the court or relevant to shot attempts, including the corners of a hoop backboard and the inside rectangle, location and geometries of the hoop, and major court lines including but not limited to the intersection of end lines and free throw lines with two free throw lanes.

When step 1020 is first started, the system may scan, using a sliding window, a frame of a captured game video and send windowed portions of the image to a trained CNN for hoop detection. When the CNN detects a likely hoop, it may give a score based on how confident the detection is. After scanning is completed, the NEX system may compare the scores of all likely hoops, apply location weighting to the scores, such that a likely hoop found near the center of the scanned video frame is awarded a higher weight, and determine which likely hoop is indeed a hoop on a basketball court. The NEX system may also look for all backboards appearing in the image, find feature points in each of them, all using a trained convolutional neural network (CNN), and use a perspective-n-point approach to yield an initial estimation of a camera projection model, which may be used to orient and rectify the ground plane, to be provided to another trained CNN to locate major court line intersections. With these identified feature points, the system may estimate multiple camera projection and court model with varying confidence and internal consistency, and finally apply a scoring mechanism to find the most likely model that is relevant to the shooting. In this process, the system may also take additional input from the mobile device's operation system such as the camera's current focal length and optical center, and the device's rotation with respect to gravity, in order to refine the models or reject invalid ones. In performing perspective-n-point, the system may make assumptions of the relative positions of the feature points in the real world, which depend on the type of backboard and basketball courts. The system may use CNN to detect and classify the backboard and basketball courts into different types, or generate multiple models by brute-forcing the different types and use the aforementioned scoring mechanism to select the most likely combination. The system may also involve the users in selecting the right model, by visualizing the detected court model through overlaying lines on the camera image, and allow users to correct any errors through nudging the relevant feature points used in the perspective-n-point calculation. Because the mobile device is not fixed to a solid structure, it is possible that it may be moved or there may be significant vibration happening during and after the detection. Correspondingly, the system may run the aforementioned detection process continuously so that the result is up-to-date, and perform detection only on when the camera provides a stable and sharp image input, through image contrast detection and reading the mobile device's motion sensors.

The aforementioned approach works when the camera has a good view of the backboard and the court lines, which is true when the mobile device is placed above ground, such as on a tripod. In some embodiments, when the mobile device is placed on the ground, the camera may not be able to see the court lines, and the system may estimate the court and camera projection from the detected backboard feature points and the mobile device's motion sensor readings, if the mobile device's placement is restricted at the sidelines.

After obtaining the court and camera projection model relevant to shooting, the system may then remember the hoop, its bounding box and create a region of interest (ROI) around it. The hoop's bounding box and ROI, and the court projection may be used for make/miss detection, ball tracking and shooting location estimation.

At step 1025, the system is ready to take images in real-time from the camera input and perform various detections. However, because the mobile device is subject to movement and vibration, the system may pre-process the images to eliminate noises due to vibration and to compensate the movements of the device. For example, the system may perform contrast detection on image, and reject blurry images caused by vibration when the contrast is lower than a running average by a certain pre-set threshold. Other motion compensation techniques are also possible. The system may also detect feature points in the image, using general feature detectors such as Binary Robust Independent Elementary Features (BRIEF), to detect how the camera has moved between sibling images or with respect to the initial image over which the original court detection process was performed, and compensate for this movement with a homographic transformation so effects of the camera movement could be eliminated from the input image sequence, before the images are fed into the next stage.

At step 1030, the system may detect one or more shot attempts by tracking all balls in a dynamically-enlarged region of interest called a ball tracking ROI, the size of which is subject to the device's processing power, using another computer vision algorithm. Basketballs detected in the ball tracking ROI over successive frames of the captured video may be grouped into ball trajectories. Each ball trajectory may be independently tracked to identify a potential shot attempt. As the name implies, a shot attempt is the process or action of attempting to shoot or drive a ball into a goal, and the result of a shot attempt may or may not be successful. The ROI created during hoop detection at step 1020 may be divided into 9 zones, as discussed with reference to FIG. 18. When a ball trajectory enters then exits the ROI through various zones, a shot attempt may be detected through heuristics. For example, in some embodiments, the system may apply motion differential to the ball tracking ROI and corresponding moving objects, and identify the basketball based on extracted features from said moving objects. In various embodiments, machine learning methods may be used to learn one or more features relevant to the basketball, such as changes in size or color of the basketball depending on angle and light settings. For instance, statistics of the color of the basketball may be collected across varying angle and light settings. In some embodiments, the system may identify a ball trajectory as a shot attempt when the basketball is determined to be at a vertical location higher than the hoop in the ROI and which falls towards the court ground afterwards. Upon identification of a shot attempt, the system may progress directly to steps 1040 and/or 1050 to analyze the shot, or to an optional step 1035 for 3D ball trajectory construction.

At step 1030, frames may optionally be sampled to track players as well, where various techniques may be applied to track and identify players. One illustrative example is provided with reference to FIG. 22.

In an optional step 1035, the system may use the shot attempt's detected ball locations, changing ball sizes detected along its 2D ball trajectory in step 1030, and a projection matrix derived in step 1020 to construct a three dimensional (3D) ball trajectory. To compute the 3D ball trajectory, each detected ball's X, Y coordinates and width in the image may be transformed by the projected matrix into a 3D coordinate. All such 3D coordinates of balls in the shot attempt's ball trajectory may then be fed into a curve fitting algorithm such as RANSAC to fit a free-fall quadratic curve as the 3D ball trajectory. This fitted 3D ball trajectory may be used to discard a shot attempt if it is determined not having been thrown towards the goal or basketball hoop, and is further illustrated in FIGS. 20A to 20C.

In step 1040, the system may detect the result of a shot attempt by following the basketball trajectory and observe pixel changes near the basketball hoop net area, which may be referred to as yet another Region of Interest (ROI). One or more heuristic conditions may be applied to determine the result of the shot attempt. Using a background subtractor such as MOG, the system may detect whether the ball passes through a hoop net and determine the result of the attempt being made or missed, also referred to as a make/miss. Depending on whether the ball has bounced at the basketball hoop, a different threshold for detecting pixel changes inside basketball hoop net area may be used. Similarly, the threshold may be affected by whether the ball is clearly detected in a hoop net region to handle scenes in which the hoop net area is blurry, resulting in less pixel changes than other scenes. In some embodiments, the system may determine that the shot attempt was a "miss" when the basketball falls below or to the side of the hoop, yet the system does not detect sufficient movements in the basketball hoop net. In some embodiments, the system may determine that the shot attempt was not yet finished if the basketball hoop net did move, but the basketball bounces above the hoop based on the identified basketball trajectory. In some embodiments, the system may determine that the shot attempt was a "make" when sufficient or substantial basketball hoop net movements are present to conclude that the ball must have passed through the hoop rim based on its estimated trajectory even though the system cannot clearly detect the basketball since it has been occluded. In different embodiments, the 3D trajectories may or may not be used for determining the result of a shot attempt. In yet some embodiments, Step 1040 may reject an identified shot attempt as a false identification, if upon further analysis of the ball trajectory it is determined that the identified ball motion was not made towards the basketball hoop.

In step 1050, the system may track the shooter that made the identified shot attempt. In some embodiments, the system may refrain from real-time tracking of all players on the court to preserve computation power and reduce energy consumption. In some embodiments, once a shot attempt is detected, the system may backtrack the basketball trajectory during a time duration, such as the previous two or three seconds, to identify one or more potential shooters who may have made the shot attempt. In some embodiments, the recorded frames of this backtracking time duration may be down-sampled or down-scaled sparsely or significantly to optimize memory usage. The system may run the given time backtracking duration of frames in reverse order of time, and use MOG background subtraction and various image filters to detect one or more moving objects from the scene, including but not limited to one or more balls and/or one or more active players. To identify the ball from all moving objects detected by the MOG detector, the system may further examine information such as the 2D trajectory, including the size, position and shape of the contour. For example, the ball should travel to the top portion of the image during a shooting action.

Furthermore, to identify a potential shooter from all moving objects as detected by the MOG detector, the system may consider information such as size, position, and whether the bottom of the moving object is at a valid court position. When the system tracks back the ball to overlap with a potential shooter's bounding box, the system may skip another time duration such as 0.5 seconds of frames before identifying shooter location, because it is very likely that after 0.5 seconds the shooter's foot is landed on the ground instead of still being in the air. In some embodiments, the system may apply motion differential to another region of interest and a corresponding moving object, to identify the potential shooter based on extracted features from said moving object. In various embodiments, machine learning methods may be used to learn various features relevant to the basketball players. In some embodiments, the 3D ball trajectory in step 1035 may be used to estimate a region of the court where the shooter should be in for the shot attempt, again by backtracking the ball trajectory. With such methods, the system may estimate a rough location of the shot attempt even without accurately identifying the basketball player that attempted the shot attempt at this step. The system then progresses to step 1060 to determine the location of the shot attempt.

In step 1060, the system may determine a foot location of the basketball player who attempted the shot, prior to taking the shot or before the shot is taken. In some embodiments, the system may use real-time object detection methods such as Tiny YOLO to detect a bounding box of a potential shooter during a given number of time frames, such as between 0.5 to 0.7 seconds before the basketball comes into contact with this potential shooter, or between 0.5 to 1 second. In particular, the system may sample a number of frames, such as 3 frames, between 0.5 to 0.7 seconds before the ball comes in contact with the potential shooter, crop the full scene image with a ROI based on the potential shooter identified from MOG detector, then feed to Tiny YOLO (a CNN algorithm) to identify the foot position of the potential shooter. Images extracted from various shooting videos may be used to train Tiny YOLO to identify foot of a person. In further embodiments, the system may limit the analysis to three to four frames for the time of interest and use an average result to further preserve computation resources and lower power consumption. In some embodiments, heuristic information extracted from a player's feature profile may be used to identify the basketball player that attempted the shot attempt among multiple potential shooters. In some embodiments, historic shooting data such as a player's preferred shooting zones may be used to identify the basketball player who attempted the shot among multiple potential shooters. Sometimes multiple feet may be identified by Tiny YOLO, which could be from the rebounder or another player in the court of the scene. The system may use a scoring system to determine who is the most probable shooter. In various embodiments, the scoring system may use the following information to compute a score for each of the players identified from Tiny YOLO:

1. A 2D ball trajectory to bias against players who are not in a ball moving direction.
2. A 3D ball trajectory to bias against players who are not within a projected shooter region.
3. A distance between a ball and a top of a player bounding box, where a shorter distance returns a higher score.
4. A distance between a center of a player bounding box and a center of a cropped image, where a shorter the distance returns a higher score.
5. A historical shooting zone to bias for a player identified in the same or neighbor zone as previous shots.
6. Bias against a player identified in a paint area if the last shot was not in the paint area.

In some embodiments, one or more sampled frames for a chosen shooter in the shot attempt is passed to player tracking technology to associate the shooter to a player identity cluster.

At Step 1070, the system may combine the result of the shot attempt result from step 1040 and the shot and shooter foot location determined via Steps 1050 and 1060. In some embodiments, if the system detects multiple shooters, or a NEX system user manually identifies multiple shooters in the recording gameplay session, the system may perform a re-clustering of all player clusters identified by player tracking technique in consideration of the timeline of each cluster and numerical representation of visual features of the players in each cluster. Finally, the process ends at step 1080.

Figure 11:
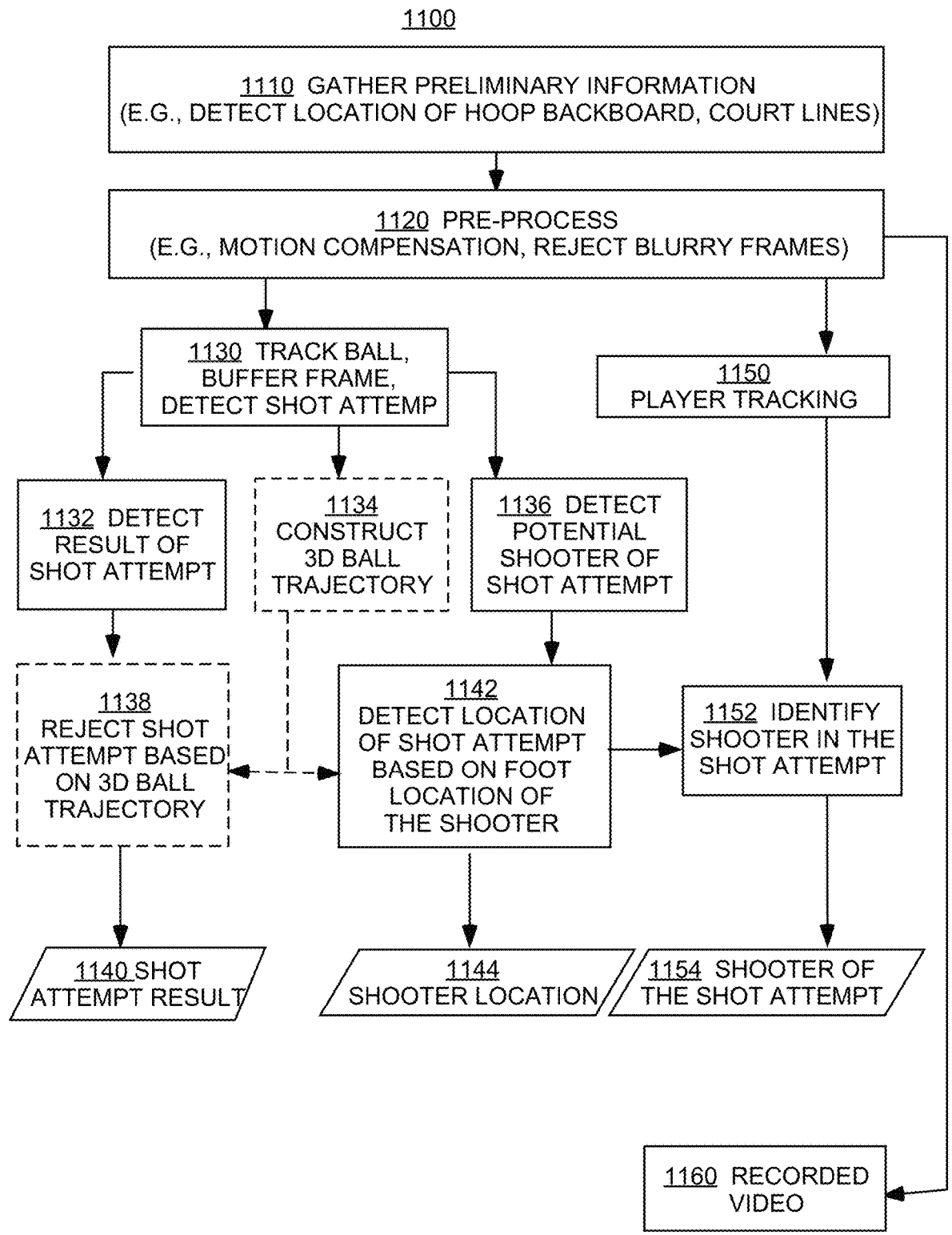
FIG. 11 is a flow diagram of another process for detection and analysis of basketball shot attempts, according to some embodiments of the present invention.

Similar to FIG. 10, FIG. 11 is a flow diagram 1100 of another process for detection and analysis of basketball shot attempts, according to some embodiments of the present invention. In particular, the embodiment illustrated by FIG. 11 optionally utilizes a 3D ball trajectory for rejecting shot attempts and detecting location of shot attempts based on foot locations of the shooter. Upon initialization, preliminary information is first collected via one or more computer vision algorithms at Step 1110. For example, various feature points of the hoop backboard and court lines may be identified to establish a visual framework for further use in shot attempt identification and analysis. Similar to Step 1025 in FIG. 10, at Step 1120 in FIG. 11, pre-processing of the input video recording may be performed, for example to compensate for minor camera motions and to reject blurry image frames. In some embodiments, such pre-processed video may be provided as an output 1160 as shown in FIG. 11.

Next, steps 1130 and 1150 may be performed individually to track or backtrack, starting from a ROI surrounding the basketball hoop, the trajectory of a moving ball of interest and one or more players who may have made the shot attempt. While Steps 1130 and 1150 are shown as parallel process steps in FIG. 11, it would be understood by persons of ordinary skill in the art that they may be executed in parallel or in series, depending on specific NEX system implementations.

In Step 1130, a ball detected in a hoop ROI may be used as a starting point for backtracking its trajectory in air, by examining buffered image frames in a pre-determined time duration, such as two seconds, to identify whether the ball and its trajectory constitute a shot attempt. Result of the shot attempt may be identified or detected in Step 1132, using hardware modules and processes similar to that utilized by Step 1040 in FIG. 10. An optional 3D ball trajectory may be constructed in Step 1134, which in turn may be used to reject a shot attempt in Step 1138. The shot attempt result may then be provided as an output 1140 to the overall process disclosed in FIG. 11, where exemplary shot attempt result may include a make or miss, or indication of an invalid shot attempt.

In parallel or subsequently, Step 1136 may be carried out to detect one or more potential shooters of the shot attempt, with a location of the shot attempted determined in Step 1142 based on a foot location of the identified shooter. The shot attempt location or shooter foot location may be provided as an output 1144 to the overall process disclosed in FIG. 11. With player cluster tracking performed in Step 1150 and shot location determined in Step 1142, the identity of the shooter who made the shot attempt may be determined in Step 1152, and provided as an output 1154 to the process disclosed in FIG. 11.

Figure 12:
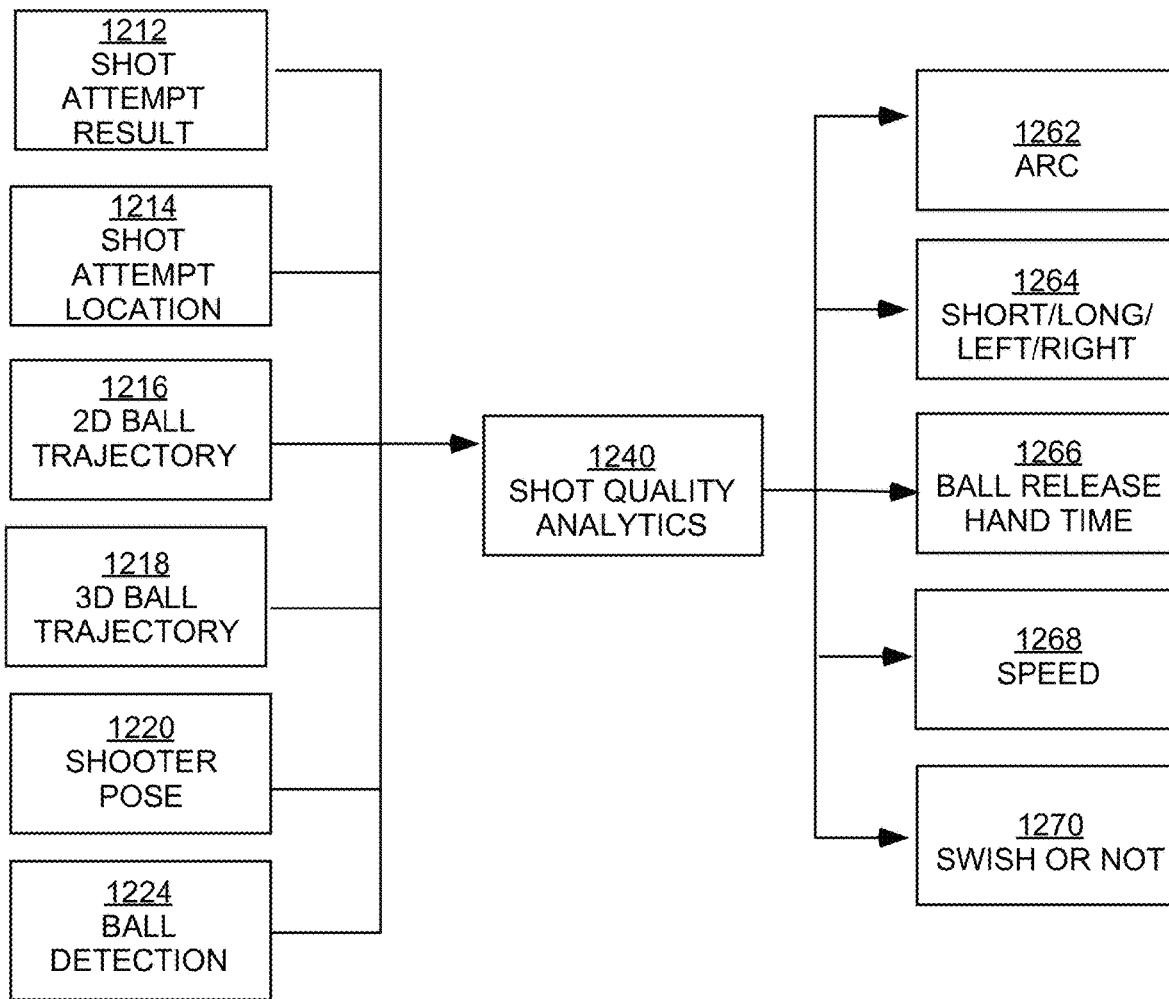
FIG. 12 is a flow diagram of a process for shot quality analysis, according to some embodiments of the present invention.

In addition to individual shot attempt detection and analysis, after each game or practice session, in some embodiments, shot quality analytic statistics and game analytics may be generated, using individual shot attempt information including 3D ball trajectories and 2D ball trajectories. FIG. 12 is a flow diagram of a process for shot quality analysis, according to some embodiments of the present invention. On the left of the diagram, various inputs for the analysis process are listed, including but not limited to, shot attempt result 1212, shot attempt location 1214, 2D ball trajectory 1216, 3D ball trajectory 1218, shooter pose 1220, and ball detection 1224. A shot quality analytics module 1240 may be implemented as part of the NEX system, on the same mobile device for video capturing or remotely on a processing server. On the right side of the diagram, exemplary shot analytics are listed, including but not limited to shot arc or ball arc 1262 (e.g., enter hoop angle, release hand angle), missed attempt reason or how a shot attempt has been missed (e.g. too short/long/left/right 1264, or is a rim rattler), shot or ball release hand time 1266, speed 1268, and swish or not 1270.

FIGS. 13 to 24 are illustrative flow diagrams and images showing exemplary embodiments to individual steps discussed in FIGS. 10 and 12. Although not indicated explicitly, some process steps represented in these figures may be optional, in different embodiments of the present invention. Similarly, each step in FIGS. 10 and 11 may be optional.

Figure 13:
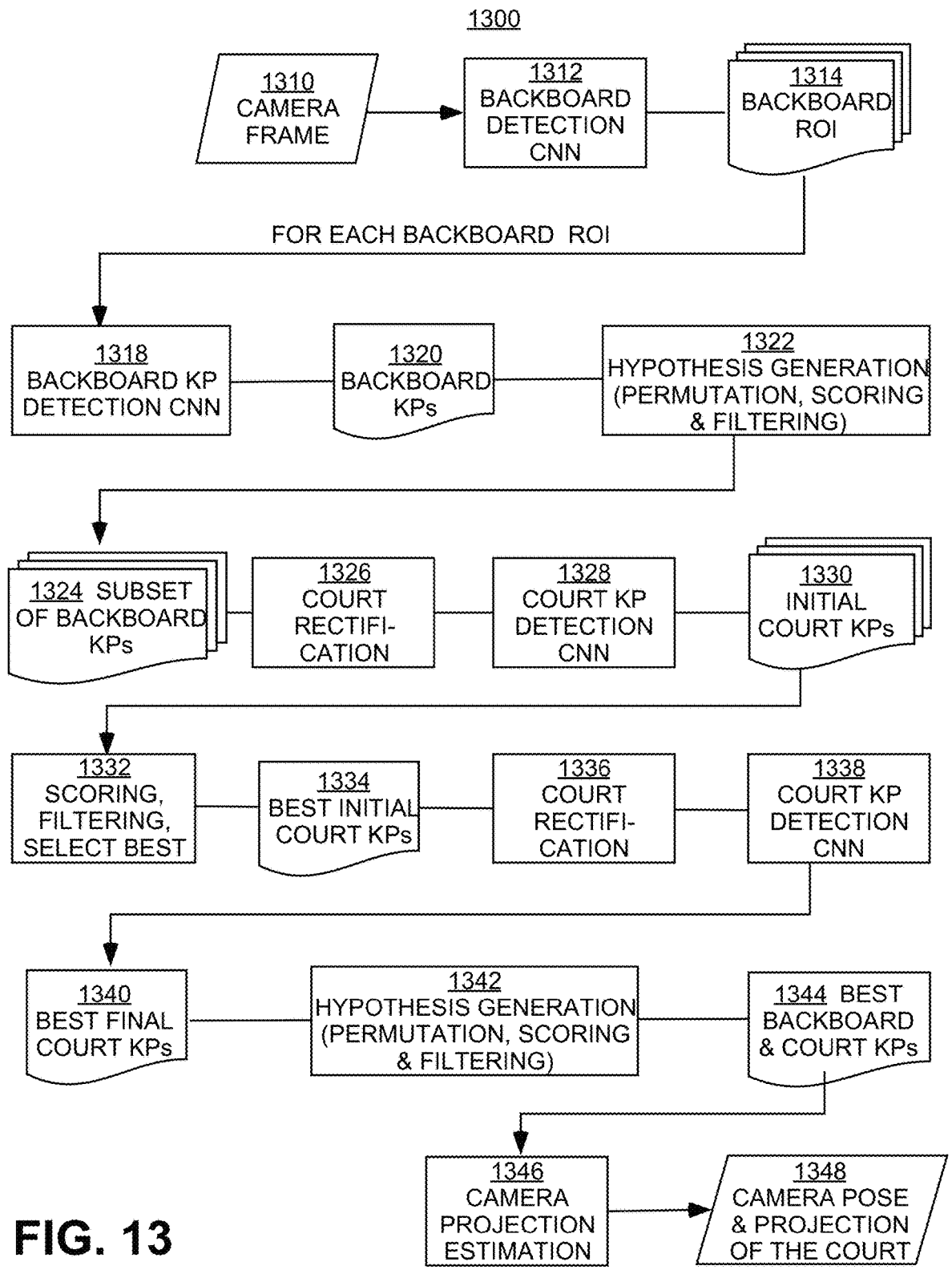
FIG. 13 is an illustrative diagram of a process for hoop and court line detection, according to some embodiments of the present invention.

FIG. 13 is an illustrative diagram of a process for hoop and court line detection, according to some embodiments of the present invention. This exemplary process flow discloses the use of multiple specialized convolutional neural networks (CNN) to detect the location of the hoop backboard and court lines by identifying key points (KPs) or key feature points within individual image frames of the input video.

Figure 14A:
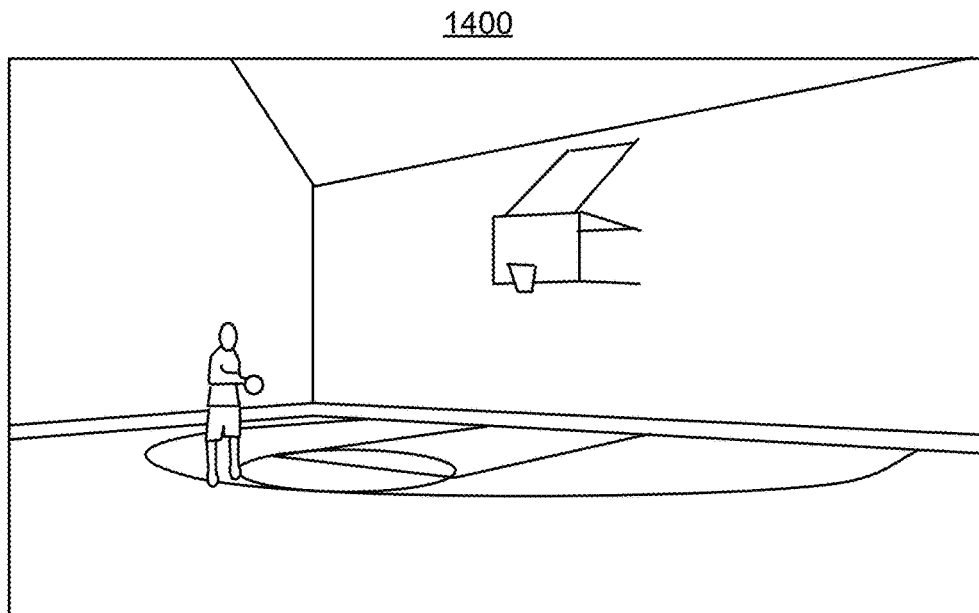
FIG. 14A is an illustrative camera frame for region of interest (ROI) identification, according to some embodiments of the present invention.
Figure 14B:
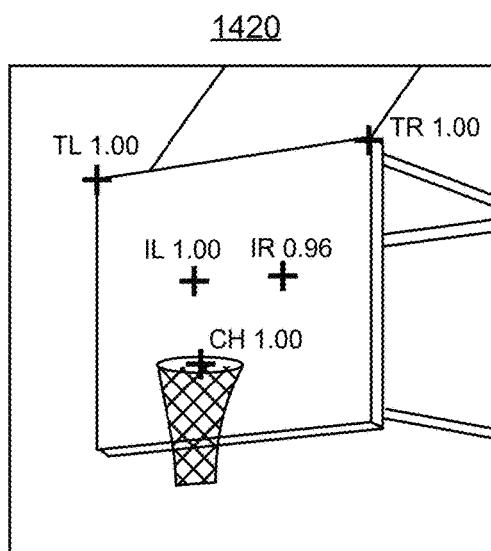
FIG. 14B is an illustrative backboard ROI with detected backboard key points, according to some embodiments of the present invention.

More specifically, in this illustrative embodiment shown in FIG. 13, one or more input video frames 1310 are first sent to a backboard detection CNN module 1312, which identifies a portion of each video frame likely to be surrounding a backboard region as a backboard Region of Interest (ROI) 1314. For each such backboard ROI, a backboard KP detection CNN module 1318 may be further applied to identify backboard KPs 1320. For example, as illustrated by FIG. 14B, five KPs indicating top left (TL), top right (TR), inner left (IL), inner right (IR), and a center of the hoop (CH) location may be identified as backboard KPs 1320. Note here process Step 1318 is also referred to as a backboard KP detection CNN module, which is an implementation of the process step. In this disclosure, process steps and its implementation may be used interchangeably.

Next, one or more hypotheses are generated for testing in Step 1322. For example, all subset combinations of the identified KPs may be considered under some constraints, where an exemplary set of constraints be the following, where variables m, p, n, q, and r are integers:
1. m backboard key points, m>p, for some p>=2;
2. n backboard key points, n>q, for some q>=1;
3. m+n>r, for some r>=4.

For each combination of the KPs, a camera projection may be estimated, to calculate the sum of confidence values of all KPs in the combination, to determine a re-projection error of each KP in each source combination, and to find any errors in the vertical direction indicated by the estimated camera projection from a vertical direction as measured by the camera's inertia measurement unit (IMU). From these, the hypotheses may be scored and filtered and rejected by one or more thresholds, and remaining hypotheses ranked using some objective function that put hypotheses with the best internal consistency and highest overall confidence on top. The result of the hypothesis generation and testing step 1322 is a subset 1324 of the backboard KPs 1320.

Figure 14C:
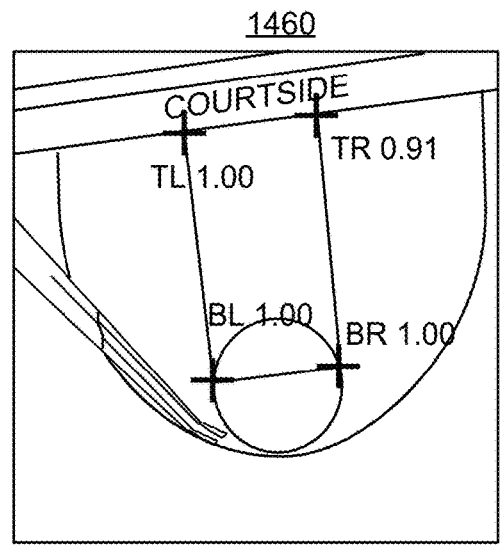
FIG. 14C is an illustrative rectified court with detected court key points, according to some embodiments of the present invention.

Next, court detection may be carried out similar to backboard detection. At step 1326, court rectification is performed, so that court lines as shown in FIG. 14A are rectified into a perspective such as shown in FIG. 14C. Specifically, court rectification refers to the process of determining camera pose and projection of the court, in terms of a linear transform having a projection matrix, and is performed for determining and displaying shot attempt locations as an analysis result. A court KP detection CNN module 1328 may be used to identify court KPs, such as the four top left (TL), top right (TR), bottom left (BL), and bottom right (BR) KPs in FIG. 14C. This initial set of court KPs 1330 may be passed to a module 1332 for scoring, filtering, and selection of one or more best initial court KPs 1334 with high confidence values. Court rectification and KP detection may be applied again on the selected subsets at Steps 1336 and 1338, providing one or more best final court KPs 1340 for hypothesis generation and testing in Step 1342. Collectively, the best backboard and court KPs 1344 may be used for camera projection estimation in Step 1346, where camera pose and an accurate projection of the court are provided as an output to the overall process shown in FIG. 13.

FIGS. 14A to 14C are corresponding images for backboard and court detection, according to some embodiments of the present invention. FIG. 14A is an illustrative camera frame 1400 for region of interest (ROI) identification; FIG. 14B is an illustrative backboard ROI 1420 with detected backboard key points (KPs); FIG. 14C is an illustrative rectified court 1460 with detected court KPs. For each detected KP illustrated in FIGS. 14B and 14C, a confidence value is provided on the accuracy of the estimation. Such confidence values are passed together with the estimated KP locations to the CNNs shown in FIG. 13 for hypothesis testing. While there are 9 total KPs shown in FIGS. 14B and 14C, in some embodiments, fewer number of KPs may be needed for generating the desired projection matrix. Thus, as illustrated in FIG. 13, multiple passes through the CNNs and hypothesis testing steps may be carried out to iteratively determine one or more best subjects of the KPs.

Figure 15:
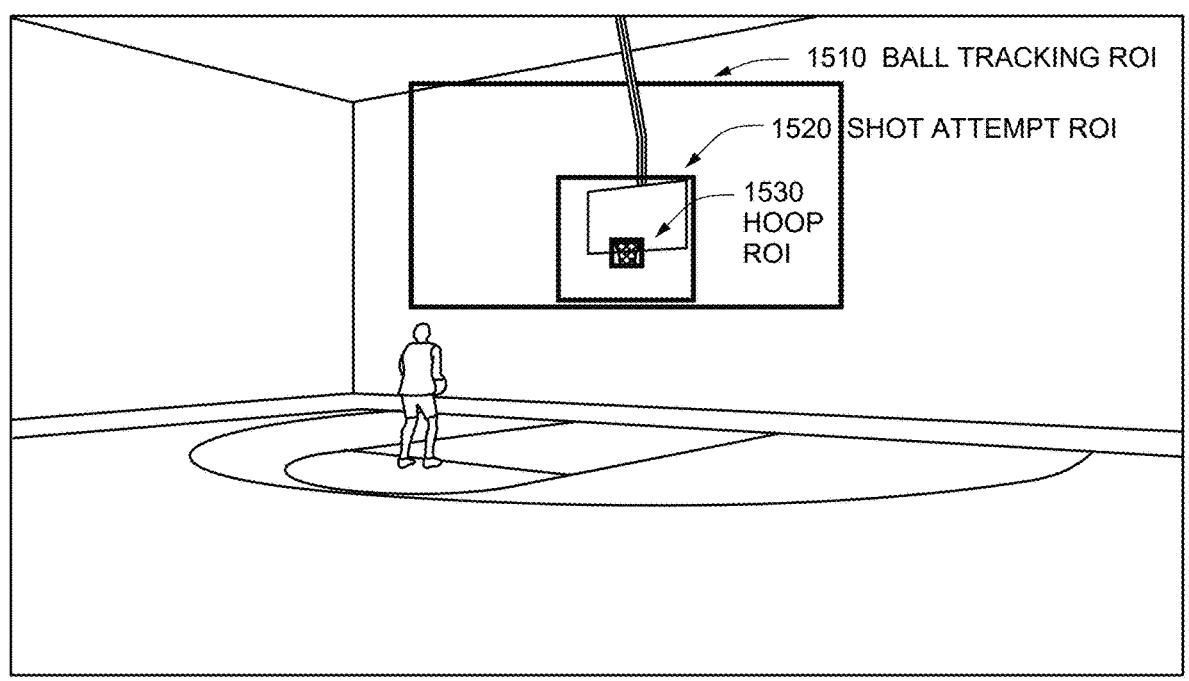
FIG. 15 is an illustrative screen capture showing several identified ROIs, according to some embodiments of the present invention.

FIG. 15 is an illustrative screen capture 1500 showing several identified ROIs, according to some embodiments of the present invention. While FIG. 14B illustrates a backboard ROI encompassing a whole basketball backboard, three different ROIs are shown in FIG. 15, respectively, for hoop detection, shot attempt detection, and ball tracking. In some embodiments, shot attempt ROI 1520 may be referred to as the backboard ROI. As the name implies, hoop ROI 1530 encloses the basketball hoop, and ball tracking ROI 1510 encloses a larger area including the backboard ROI for tracking the movement of a ball around the backboard. In different embodiments of the present invention, the size of each ROI may depend on the available processing power, where a larger ROI is utilized when more computation resources are available. The use of ROIs limits the computer vision and image recognition processes to only portions of the video that are highly relevant to shot attempt detections.

Figure 16:
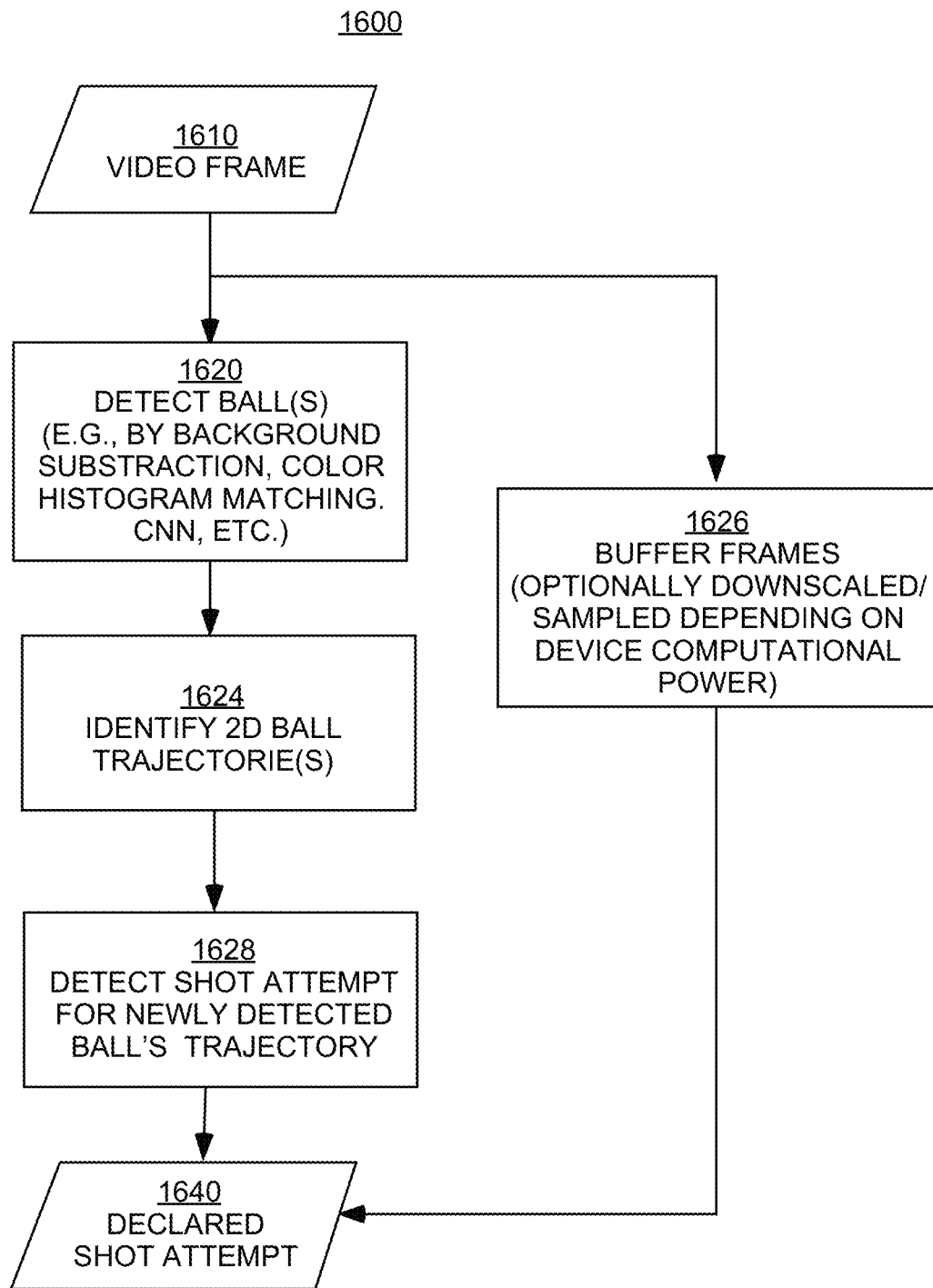
FIG. 16 is a flow diagram of a process for ball tracking, frame buffering, and initial shot attempt detection, according to some embodiments of the present invention.

FIG. 16 is a flow diagram 1600 of a process for ball tracking, frame buffering, and initial shot attempt detection, according to some embodiments of the present invention. In this illustrative example where tracking may be viewed as performed in the forward direction, given input video frames 1610, one or more balls may be first detected in Step 1620, using one or more computer vision algorithms such as background subtraction, color histogram matching, convolutional neural networks and the like may be applied for ball detection. In Step 1624, one or more 2D ball trajectories may be identified by following the motion of the detected balls in air. A detected ball may be assigned to an on-going 2D trajectory if the ball is close enough to an expected "next ball" location of the ball trajectory. If none of on-going 2D ball trajectories matches a detected ball, a new 2D ball trajectory may be created and the detected ball may be assigned to the new 2D trajectory. In Step 1628, a shot attempt for a newly detected ball's trajectory may be determined, detected, or declared if one or more conditions are satisfied by the trajectory. For example, if any downward motion in the upper regions of a shot attempt ROI is detected, a shot attempt may be declared. The declared initial shot attempts, including corresponding ball trajectories, may then be passed together with buffered frames to the process shown in FIG. 17.

Figure 17:
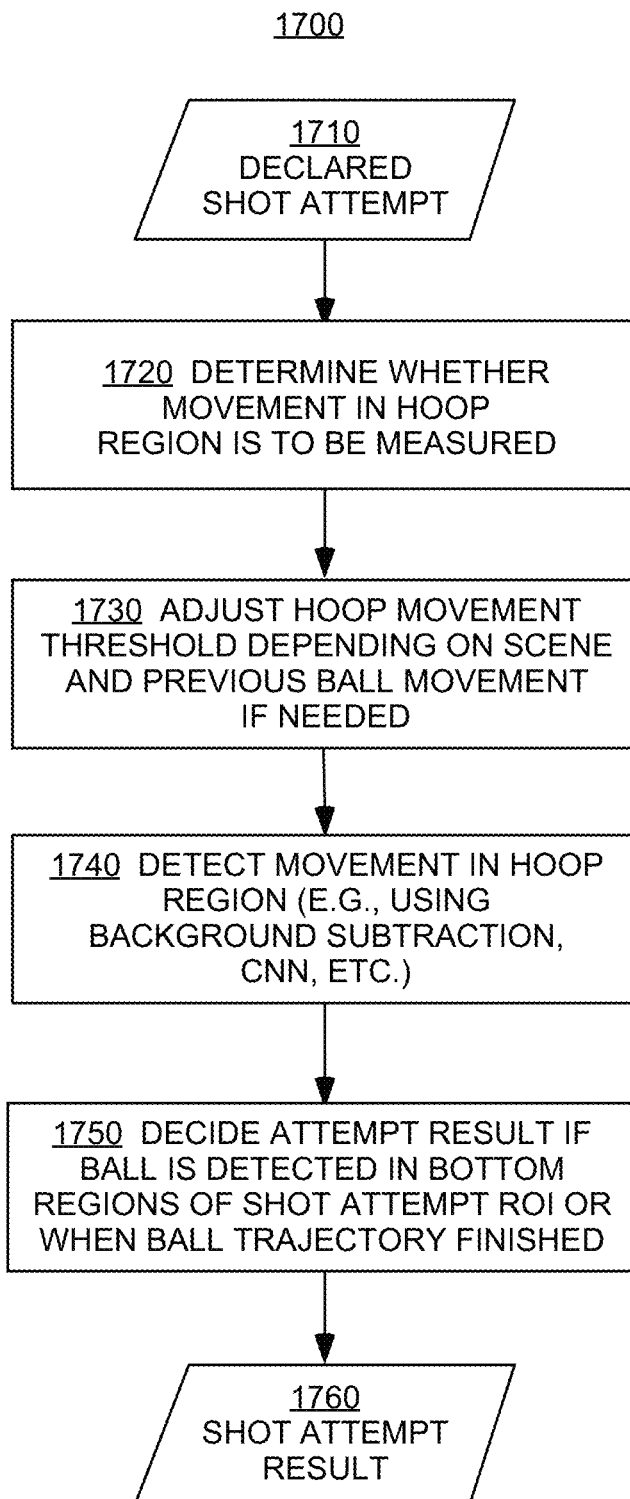
FIG. 17 is a flow diagram of a process for shot attempt result determination, according to some embodiments of the present invention.

FIG. 17 is a flow diagram 1700 of a process for shot attempt result determination, according to some embodiments of the present invention. An input declared shot attempt 1710 may include positions of a newly detected ball in a shot attempt ROI, and its corresponding 2D ball trajectory. In Step 1720, the NEX system may determine whether movement in a hoop region is to be measured. If the ball is detected in a non-hoop region, movement in the hoop's region does not need to be considered. Here hoop movement refers to the movement of the basketball hoop and net, which when present may indicate contact of the ball with the hoop, either in a make or miss shot action. In Step 1730, hoop movement threshold may be adjusted, depending on scene and previously ball movement if needed. In Step 1740, movement in hoop region or hoop movement may be detected, using computer vision algorithms such as background subtraction, CNN, and the like. At step 1750, a shot attempt result may be decided, taking into account the detected hoop movement, if the ball is detected in the bottom regions of a shot attempt ROI or when the ball trajectory is finished. The shot attempt result is then provided as an output 1760.

Figure 18:
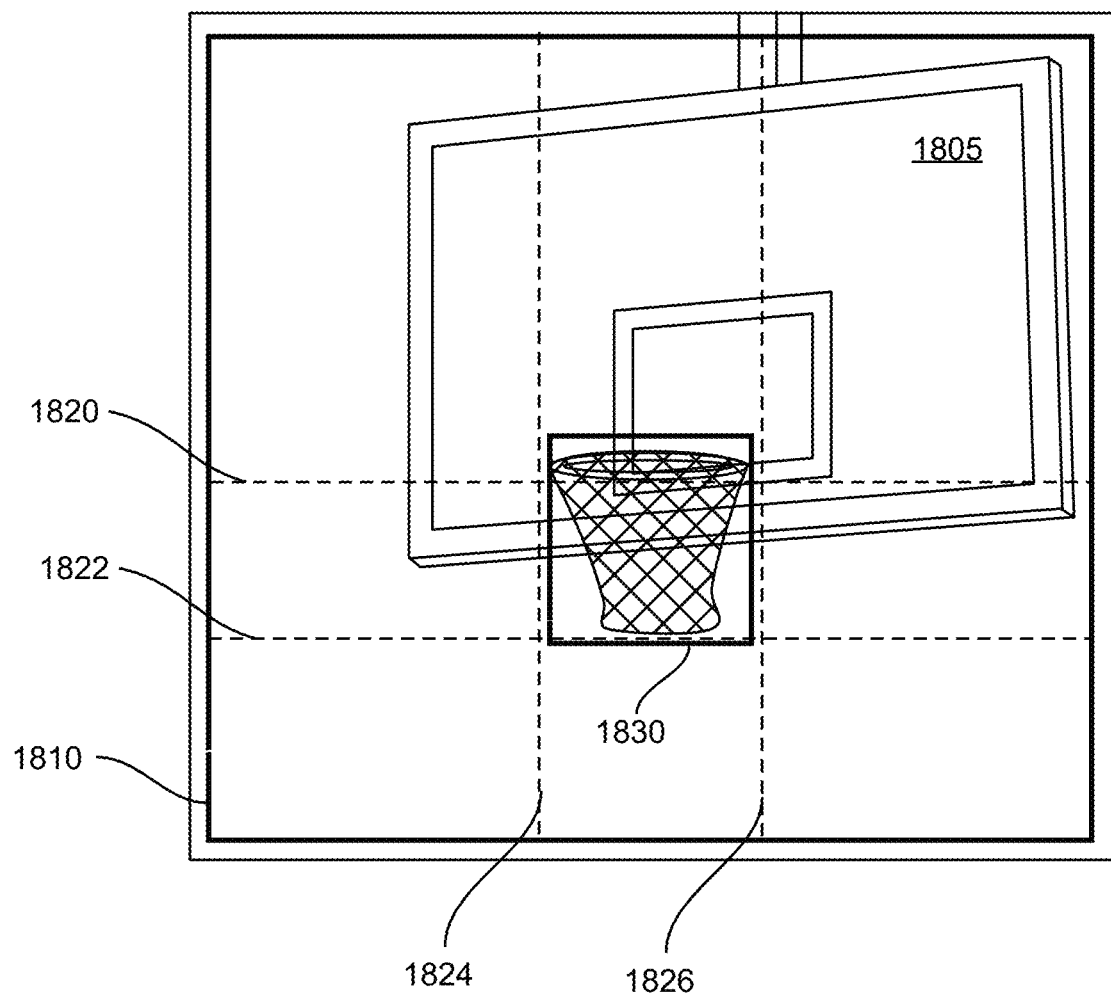
FIG. 18 is a diagram illustrating ROIs for shot attempt detection, according to some embodiments of the present invention.

FIG. 18 is a diagram 1800 illustrating ROIs for shot attempt detection, according to some embodiments of the present invention. In this illustrative example, a shot attempt ROI 1810 enclosing backboard 1805 is divided into 9 different regions, with division lines 1820, 1822, 1824, and 1826 bounding the detected hoop inside hoop ROI 1830, where the top horizontal division line 1820 is positioned slightly below a top boundary of the detected hoop. By tracking the movement of the ball throughout this shot attempt ROI, in and out individual regions, and/or by optionally analyzing hoop net movements, embodiment of the present invention allow accurate classification of a shot attempt as a make, a miss, or as having other characteristics.

Figure 19:
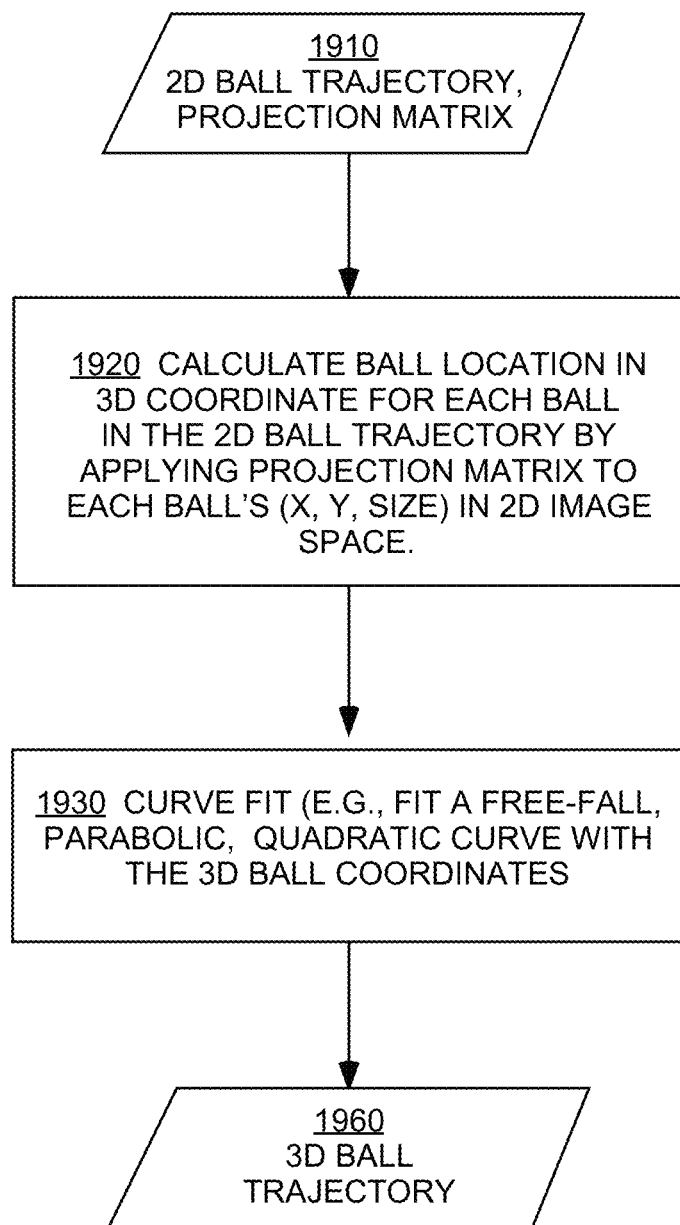
FIG. 19 is a flow diagram of a process for constructing a 3D ball trajectory, according to some embodiments of the present invention.

FIG. 19 is a flow diagram 1900 of a process for constructing a 3D ball trajectory, according to some embodiments of the present invention. Correspondingly, FIGS. 20A, 20B, and 20C are respective diagrams showing different views of a 3D ball trajectory, according to some embodiments of the present invention.

Note that the detected size of a ball becomes smaller as it travels further away from the camera. Thus, the size of the ball may be viewed as providing depth information, and positions of the ball in the captured video may be used to calculate where the ball should be in 3D space. Together with identified 2D coordinates, such depth information may be used for projection onto 3D coordinates. With input 1910 including 2D ball trajectory and calculated projection matrix, in Step 1920, the NEX system may calculate ball location in 3D coordinates for each ball in the 2D ball trajectory by applying the projection matrix to each ball's (X, Y, size) coordinates in 2D image space. Curve fitting may then be performed in Step 1930. For example, a free-fall, parabolic, quadratic curve may be fitted with the 3D ball coordinates to generates an output 3D ball trajectory 1960. Some information, such as the depth of a ball, may be less accurate than others, such as the (X, Y) coordinates. The process shown in FIG. 17 may be tuned to accommodate the precision of each parameter in curve fitting to get better results.

Figure 20A:
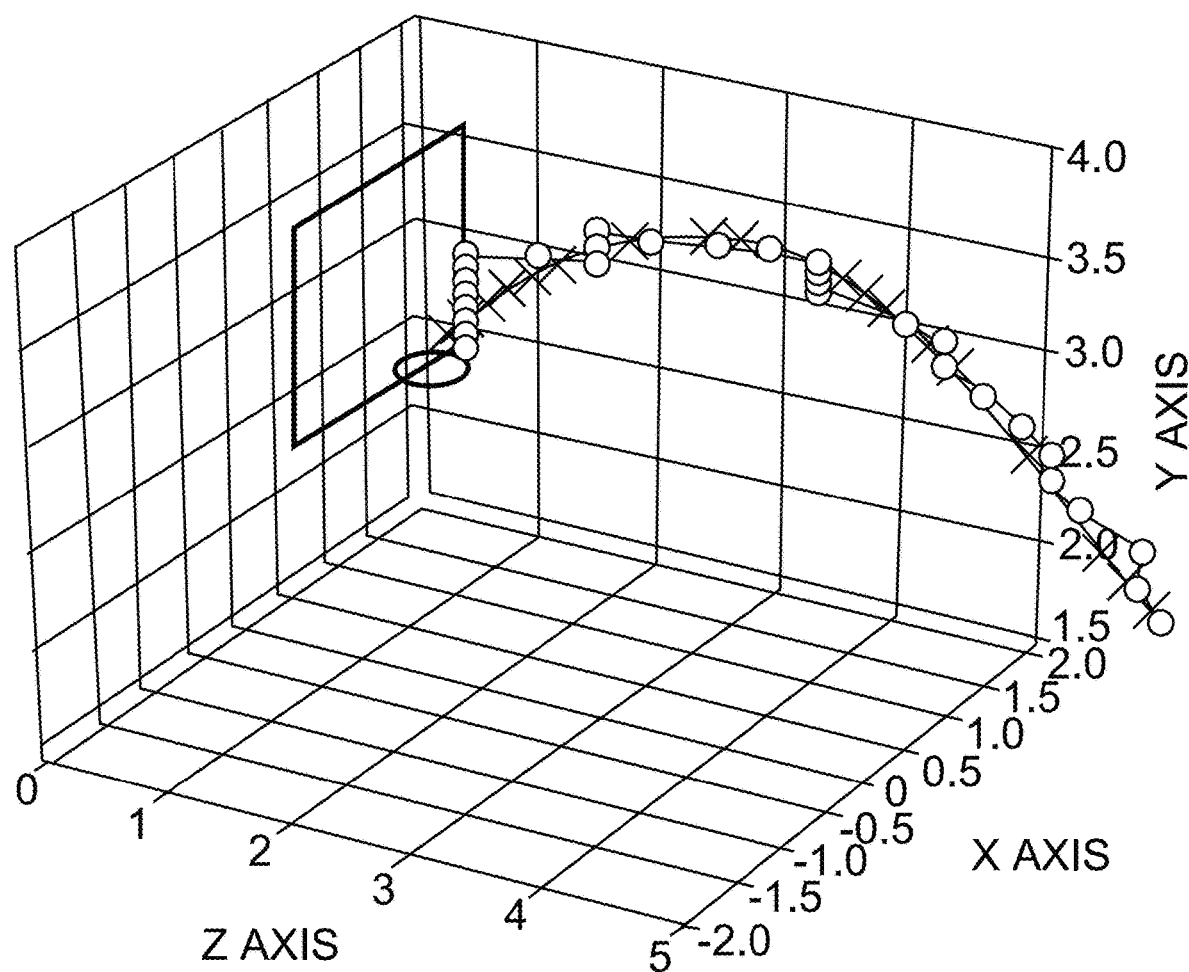
FIGS. 20A, 20B, and 20C are respective diagrams showing different views of a 3D ball trajectory, according to some embodiments of the present invention.
Figure 20B:
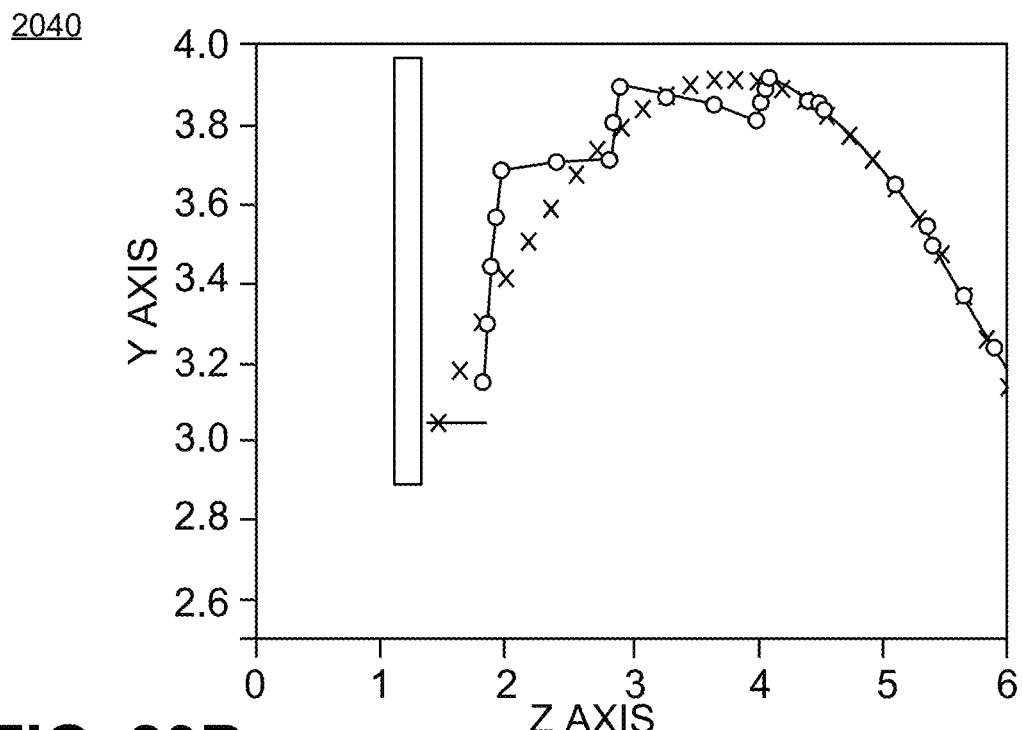
Figure 20C:
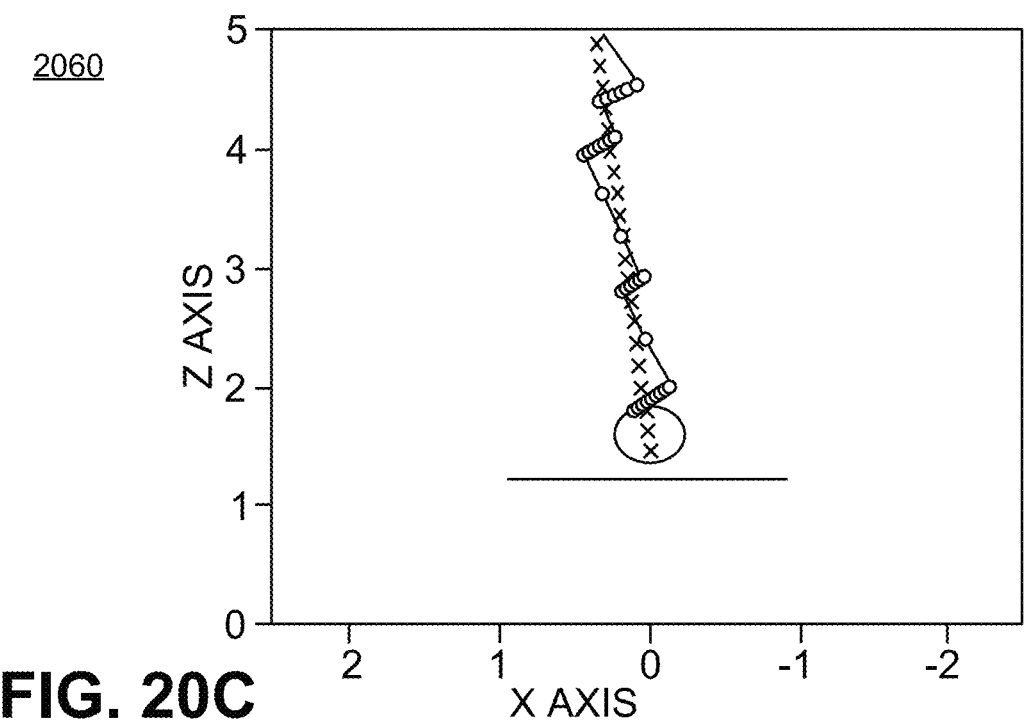

Illustrative 3D coordinates are shown as circular dots in FIG. 20A as an example. Again, as the ball travels further away from the camera, its width or size becomes very narrow or small. Therefore, when projected into 3D space, the estimates become less accurate, and the circular dots shown are "jittery" in nature. As a further refinement, a parabolic curve may be fitted to estimate the 3D trajectory of the ball, which is shown with crosses in FIG. 20A. Two different side and top perspective views of the 3D trajectory are shown respectively in FIGS. 20B and 20C, illustrating the data points and the fitted 3D trajectory relative to the backboard. The use of 3D trajectories is advantageous. 3D trajectories may be used to distinguish shot attempt and passing by whether the ball is moving towards the hoop. In addition, 3D trajectories may be used to assist in the determination of shooter identities: a 3D trajectory may provide an estimated region of shooter location using backward tracking.

Figure 21:
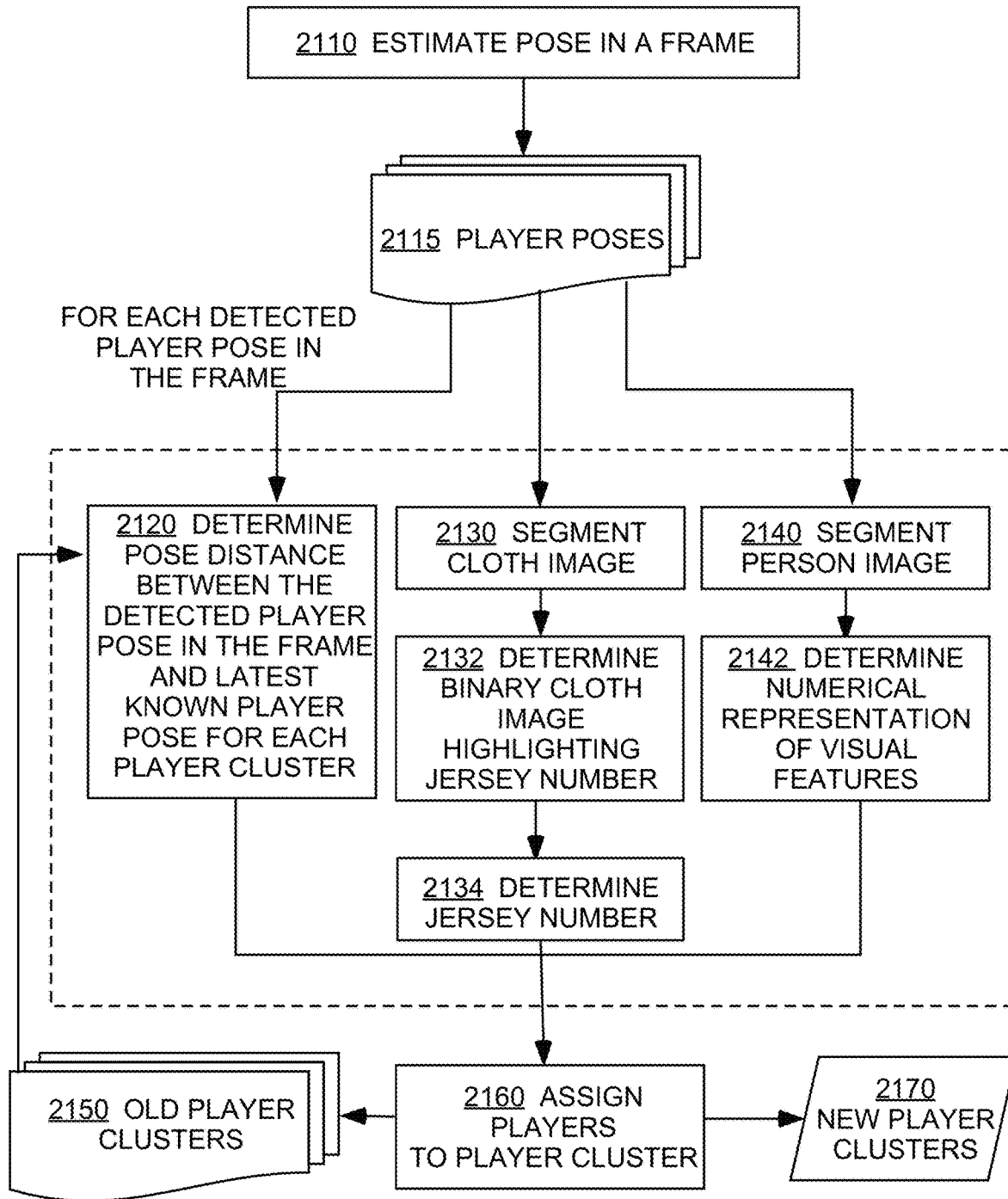
FIG. 21 is a flow diagram of a process for player tracking, according to some embodiments of the present invention.

FIG. 21 is a flow diagram 2100 of a process for player tracking, according to some embodiments of the present invention. Correspondingly, FIG. 22 is a diagram 2200 showing exemplary player clusters for player identification and tracking. When more than one player is present, the player tracking process may be viewed as an image classification process, where individual images 2220 of players cropped from individual video frames are correlated and assigned to different "player clusters" 2240 and 2260. Such correlation may be conducted over various visual features including but not limited to pose, clothing (e.g., color, jersey number), and facial features. As the name "tracking" implies, this classification process is performed on individual frames, and is cumulative, where a newly identified player image or numerical representation may be assigned to and update an existing player cluster. In some embodiments, player identification/classification is not performed every frame, but rather, for example, every other frame or every 3 to 5 frames. Such temporal down-sampling allows a reduction in computation complexity. In addition, spatial down-sampling is also possible, where a frame may be down-sized or down-sampled first.

More specifically, tracking players involves clustering players detected in different sampled frames into groups. All players in the same group may be considered as having the same player identity. Deciding whether to group a detected player A in a latest sampled frame into a cluster C or create a new cluster may depend on one or more of the following factors:

1. Distance (may be aggregated/weighted, e.g., hand/leg) between a player in the latest frame in a cluster C (Cluster C player) and player A. Each cluster refers to a possible player. (e.g., Frame 1: Players A and B, Frame 2: may be Players A and B, may be B and C). FORWARD: group players together if very confident.

2. Similarity in terms of visual features (e.g., hair, facial feature, the look of the player) of player A and visual features of players in cluster C. Neural networks that understand the visual look of people may be used. Machine Learning (ML) network may be used to extract the features of a player, to represent it numerically, for example, as a vector of 1000 numbers. This numerical representation may be used to identify the difference (some norm).

3. Jersey number of player A and players in cluster C.

In some embodiments, the NEX system may first estimate pose in a sampled frame by applying a special mobile device-optimized pose estimation convolutional neural network to detect all players' pose 2115 in the sampled frame. For each detected player pose in the frame, at step 2120, a pose distance may be determined between the detected player pose in the sampled frame and latest known player pose for each player cluster. A distance between cluster C player and player A may be computed by weighting an average of distance between each body part of cluster C player and player A. In some embodiments, if the computed distance is larger than a threshold, player A may not be added to cluster C. In some embodiments, if any body part moves significantly more than the other body parts, player A may not be added to cluster C.

To extract visual features of a player for comparison, detected pose of each player may be used to segment the player from the image in step 2140. In Step 2142, the segmented player image may be passed to a specially trained convolutional neural network to extract a numerical representation of visual features of the player in the form of vector of floating point numbers. Similarity of visual feature of the two players is computed by numerical technique such as an L2 norm distance of the two vectors. In some embodiments, similarity of visual features of the player A and players in the cluster C may be ranked against other clusters to determine which cluster player A should be added to. If the similarity is too low, a new cluster may be created for player A.

While individual players on the court may be continuously recognized during a live game play, and corresponding shot attempts made by the players may be detected as well, in some embodiments, player identification may be performed at the end of a given session or the end of a video recording. Correspondingly, individual shot or game statistics are computed after player identification.

In Step 2130, to detect jersey number of each player, the NEX system may extract a segmented cloth image of the player based on detected pose of the player. Statistical clustering techniques like K-means or more advanced techniques like GrabCut may be adopted to segment foreground and background of the player's cloth to produce a binary representation of cloth image highlighting the jersey number in Step 2132. Geometry transformation may then be applied to the binary image to make the jersey number upright. A geometric analysis may then be applied to split multiple numbers on cloth into individual numbers. Each such binary image containing one number may be passed to a number recognition convolutional neural network to extract the jersey number in Step 2134. If player A has the same jersey number as players in cluster C, player A has a higher chance of being added to cluster C.

To accommodate limited computational power of mobile devices, frames may be sampled and downsized and may be sent to the cloud to perform all or some of the aforementioned techniques to assist player tracking.

While steps 2120, 2130 and 2140 are states as parallel processes in FIG. 21, they may be performed in parallel or in sequence, depending on specific implementation details of the NEX system.

Once pose distance, jersey number, and numerical representation of visual features are identified, players may be assigned to player clusters in Step 2160, where old player clusters 2150 may be reprocessed or updated, and new player clusters 2170 may be generated.

Figure 23:
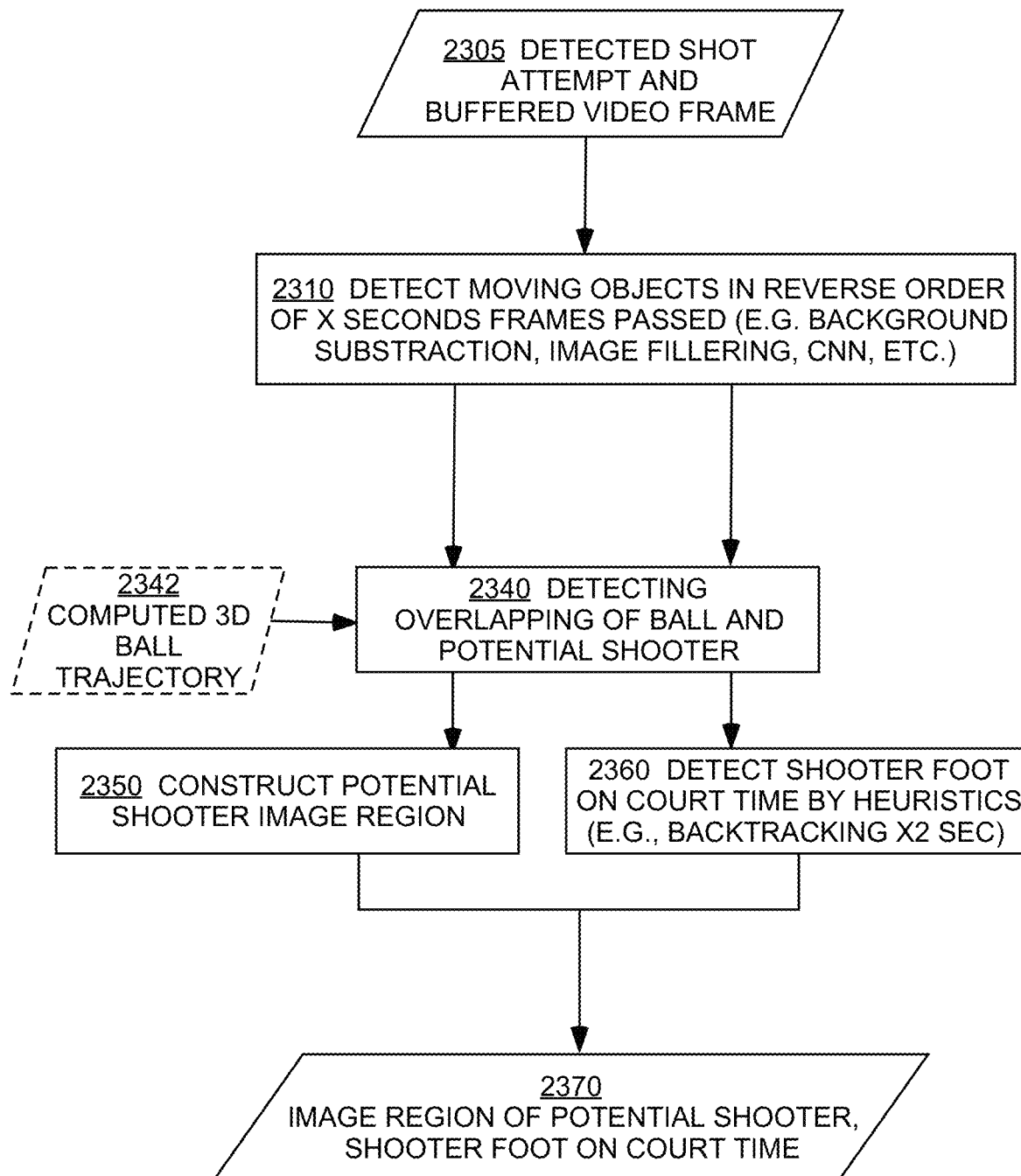
FIG. 23 is a flow diagram of a process for detecting potential shooters and shot attempt, according to some embodiments of the present invention.

FIG. 23 is a flow diagram 2300 of a process for detecting potential shooters and shot attempt, according to some embodiments of the present invention. Instead of forward processing, detecting the shooter and its foot location may require frame buffering and a "backtracking" process, possibly using the 3D trajectory computed previously. In addition, when more than one player is present, 2D and 3D trajectories as estimated previously may be used to differentiate the different players.

More specifically, triggered by a detected shot attempt and using one or more buffered video frames as input 2305, in Step 2310, moving objects such as one or more balls may be detected in reverse order of X seconds frames passed, using computer vision techniques such as background subtraction, image filtering, CNN, and the like. Next at Step 2340, overlapping regions of ball and potential shooter is detected, again using computer vision techniques such as background subtraction, image filtering, CNN, and the like. An optional computed 3D ball trajectory 2342 may be used as input for this process step. At Step 2350, a potential shooter image region is constructed, while at step 2360, shooter foot location on the court may be detected by using heuristics. For example, the buffered video frames may be backtracked for X2 seconds, where X2 may equal to 0.5, 1 or some other appropriate number. Further backtracking of the video frames may also be performed to detect the shooter by a CNN, and pick the image where the foot location becomes more stable vertically. The image region of the potential shooter and the shooter foot on court time may be provided as output 2370.

Figure 24:
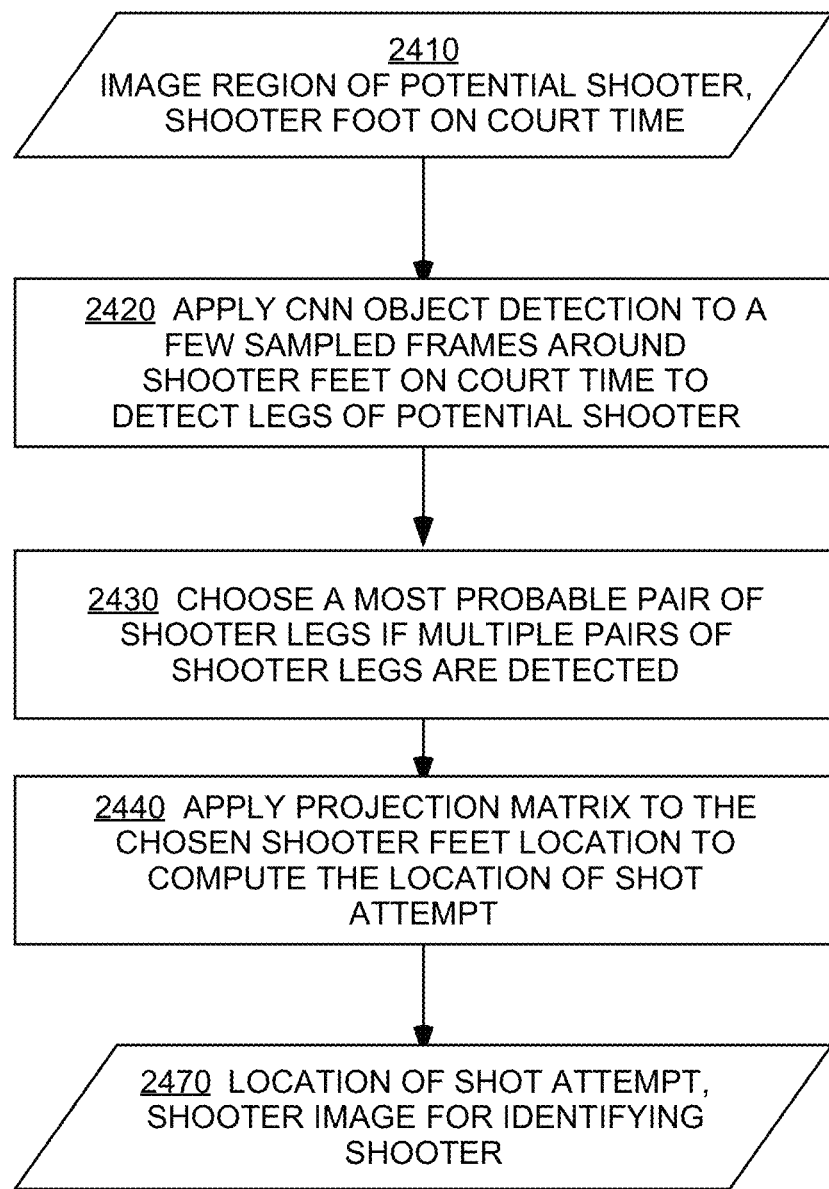
FIG. 24 is a flow diagram of a process for detecting location of a shot attempt based on foot location of a shooter, according to some embodiments of the present invention.

FIG. 24 is a flow diagram 2400 of a process for detecting location of a shot attempt based on foot location of a shooter, according to some embodiments of the present invention. The image region of the potential shooter and shooter foot on court time may be used as input 2410. At Step 2420, a CNN object detection may be applied to a few sampled frames around the shooter's feet on court time to detect legs of potential shooter. At step 2430, a most probable pair of shooter legs is chosen if multiple pairs of shooter legs are detected. In some embodiments, detected legs may be scored based on one or more of the following factors: a 2D ball trajectory to bias against players who are not in the ball moving direction; a 3D ball trajectory to bias against players who are not within the projected shooter region; a distance between the ball and the top of the player bound, where a shorter distance returns a higher score; a distance between the center of the player bound and center of the cropped image, where a shorter distance returns a higher score; a historical shooting zone to bias for a player identified in the same or neighbor zone as the previous shots; bias against a player identified in the paint area if the last shot was not in the paint area. Next, in Step 2440, the projection matrix as previously computed may be applied to the chosen shooter feet location to compute the location of the shot attempt.

Both the identified shot attempt location and the shooter image for identifying the shooter may then be provided as output 2470.

As another example, FIGS. 25 to 29 provide a sequence of exemplary screen captures for the overall game analytics generation process.

Figure 25:
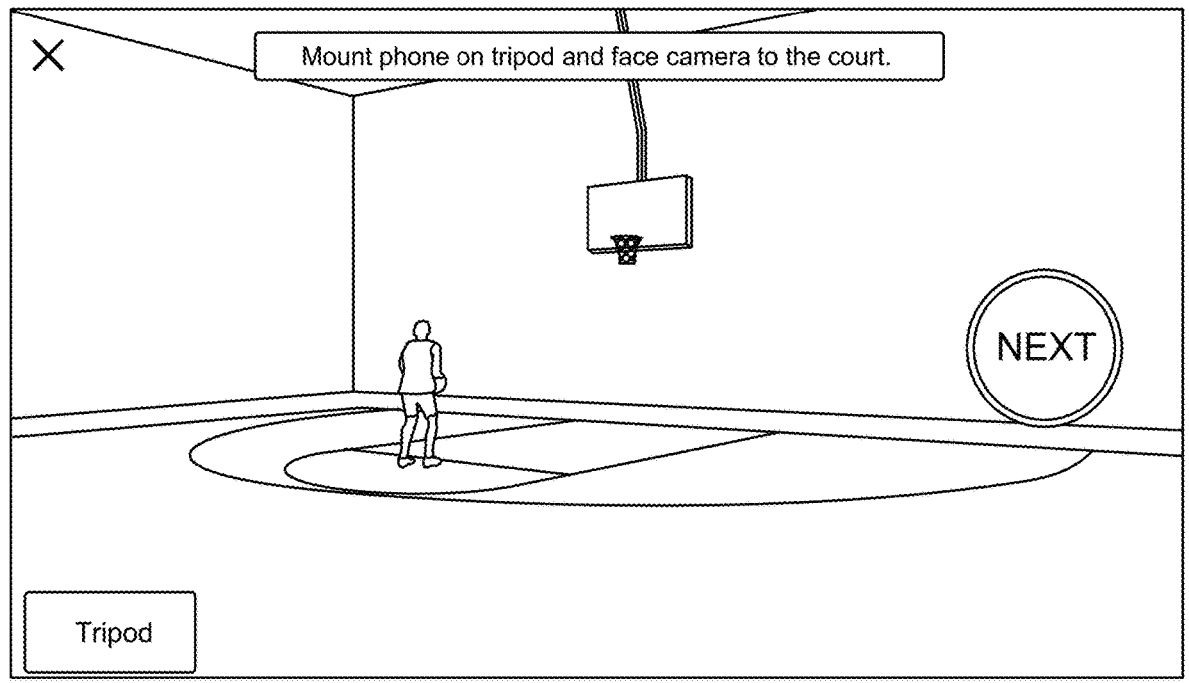
FIG. 25 is a screen capture of the basketball analytics system upon initialization, according to some embodiments of the present invention.
Figure 26:
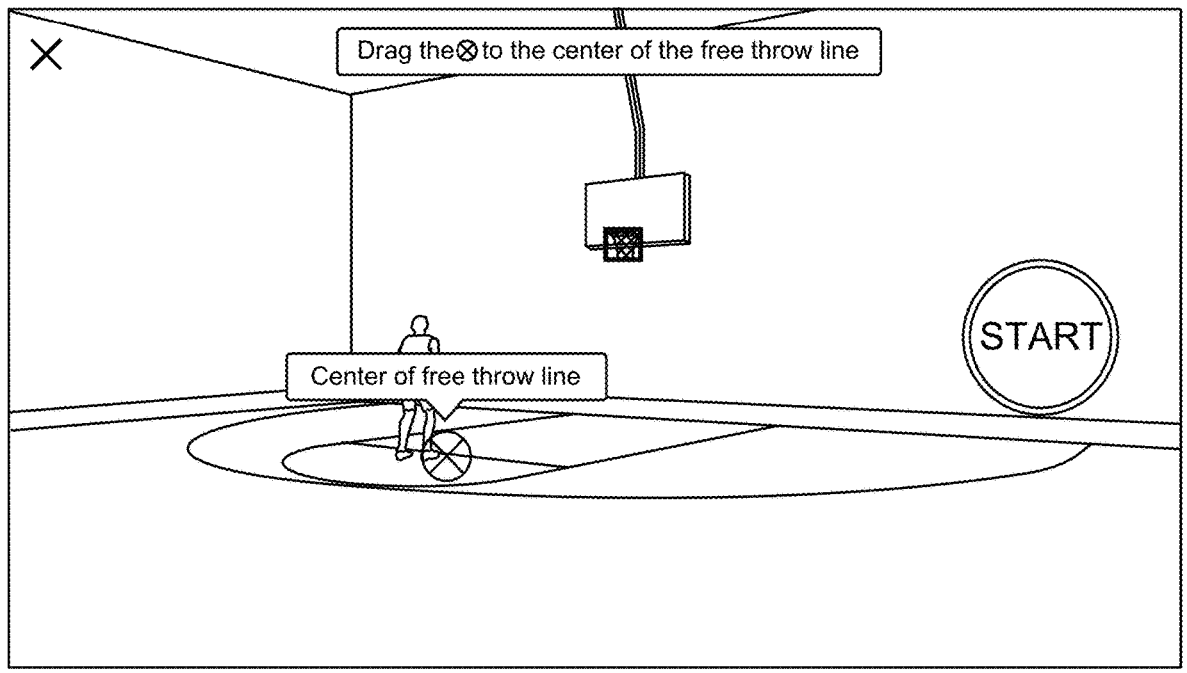
FIG. 26 is another screen capture of the basketball analytics system upon initialization, according to some embodiments of the present invention.

FIGS. 25 and 26 are two screen captures of the basketball analytics system upon initialization, respectively, according to some embodiments of the present invention. In FIG. 25, an instruction is provided to the user to stabilize and locate the camera on a tripod. In FIG. 26, the system not only automatically locates court lines and positions such as the center of the free throw line and the hoop, but also provides the option of having the user identify or verify these locations visually and adjust if necessary.

Figure 27:
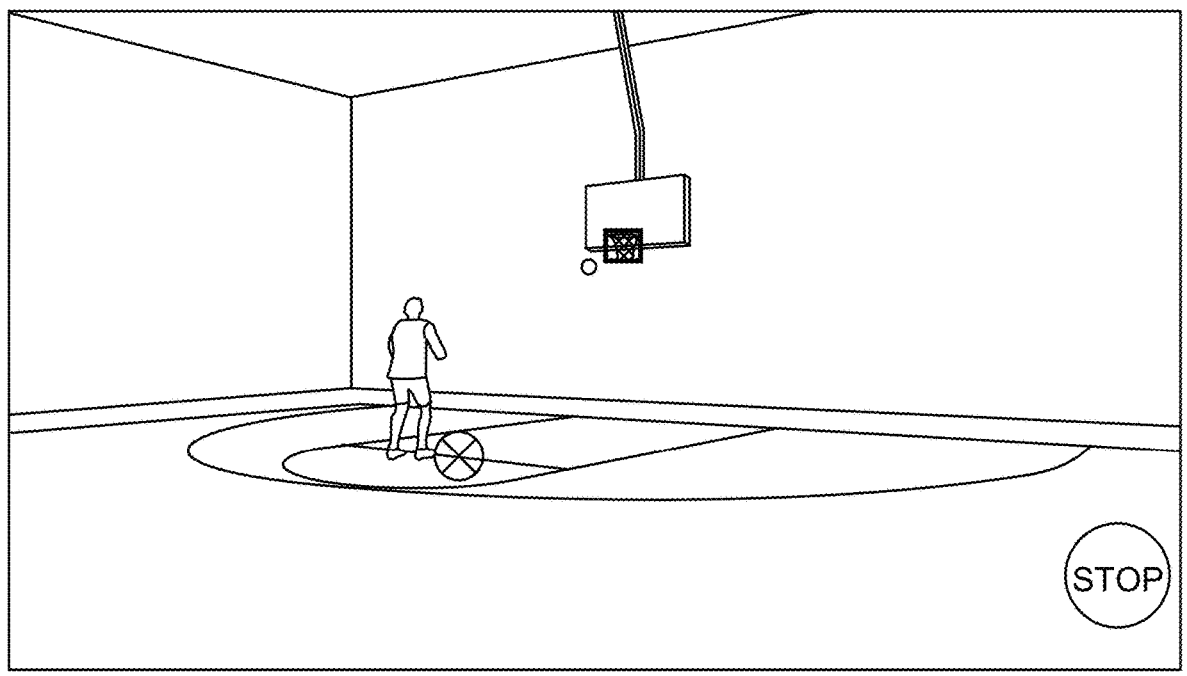
FIG. 27 is a screen capture of a real-time recording of a successful shot attempt, according to some embodiments of the present invention.

FIG. 27 is a screen capture of a real-time recording of a successful shot attempt, according to some embodiments of the present invention. In this example, the shot attempt has been identified through the processes discussed with reference to FIGS. 10 to 24. Although not shown explicitly, in some embodiments, the successful shot attempt result may be indicated or displayed on screen as well. In addition, a "stop" button is provided for the user to terminate the current recording session. In some embodiments, other options may be provided to pause the recording session, to reinitialize the court and hoop detection process, or to continue the recording process but display game statistics instead of game recordings on the screen.

Figure 28:
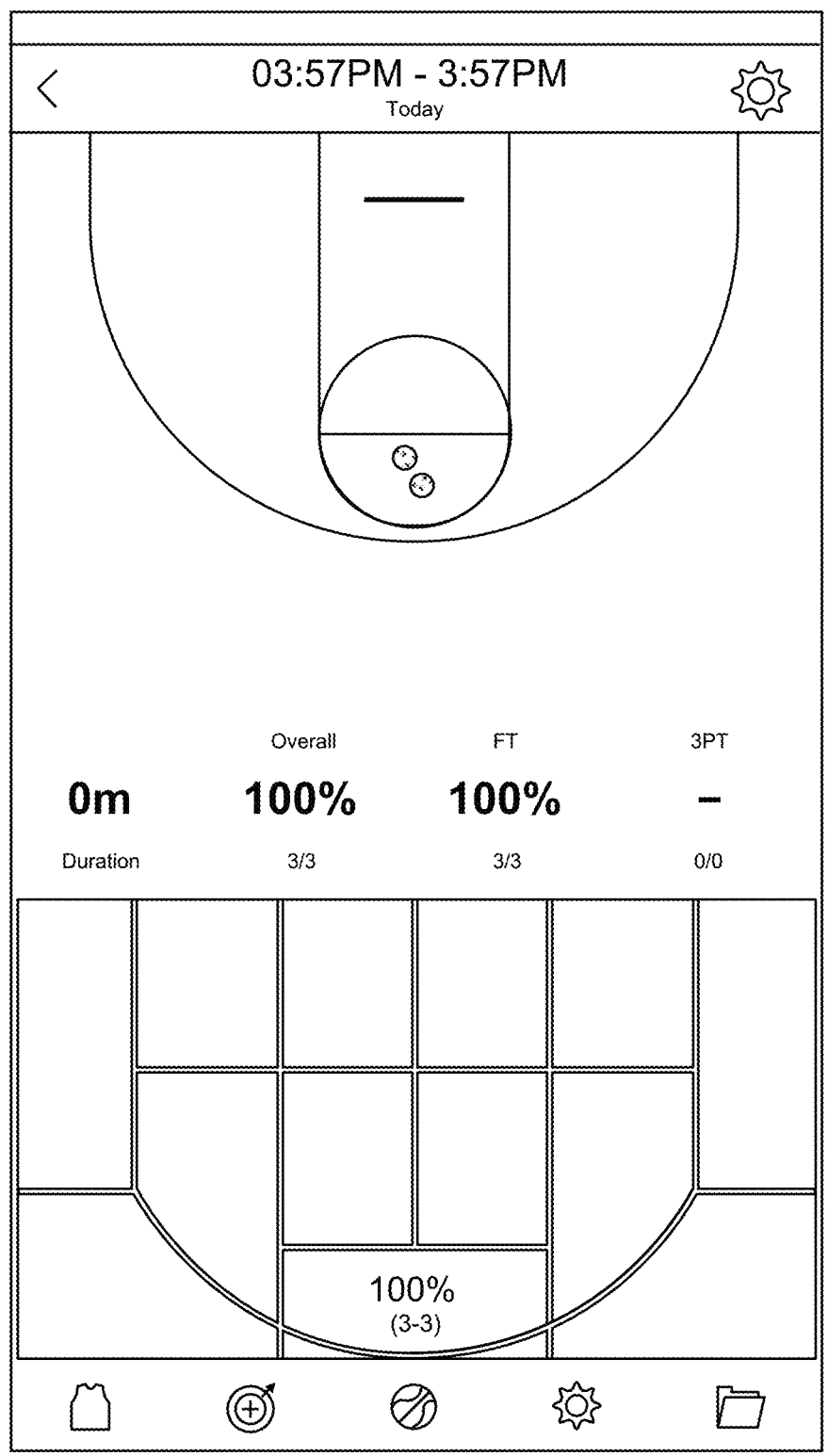
FIG. 28 is a screen capture of a result chart for the game shown in FIG. 27, according to some embodiments of the present invention.
Figure 29:
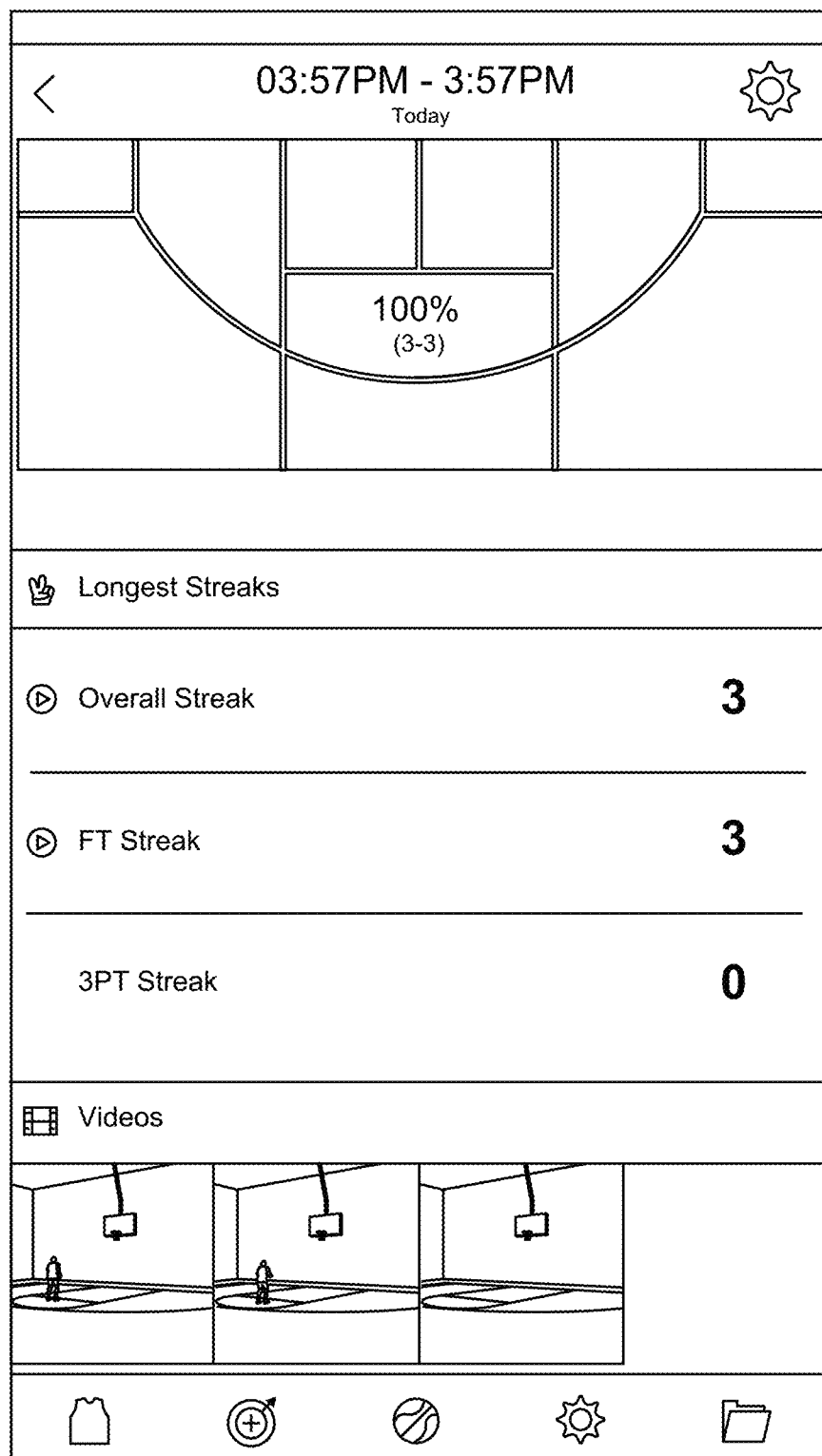
FIG. 29 is a table of game statistics for the game shown in FIG. 27, according to some embodiments of the present invention.

FIGS. 28 and 29 are screen captures of a result chart and statistics for the game shown in FIG. 27, respectively, after three successful shots have been made from the center of the free throw line, according to some embodiments of the present invention. Individual per-shot video clips may be selected on the screen shown in FIG. 29 for further review by the user.

NEX Platform

Figure 30:
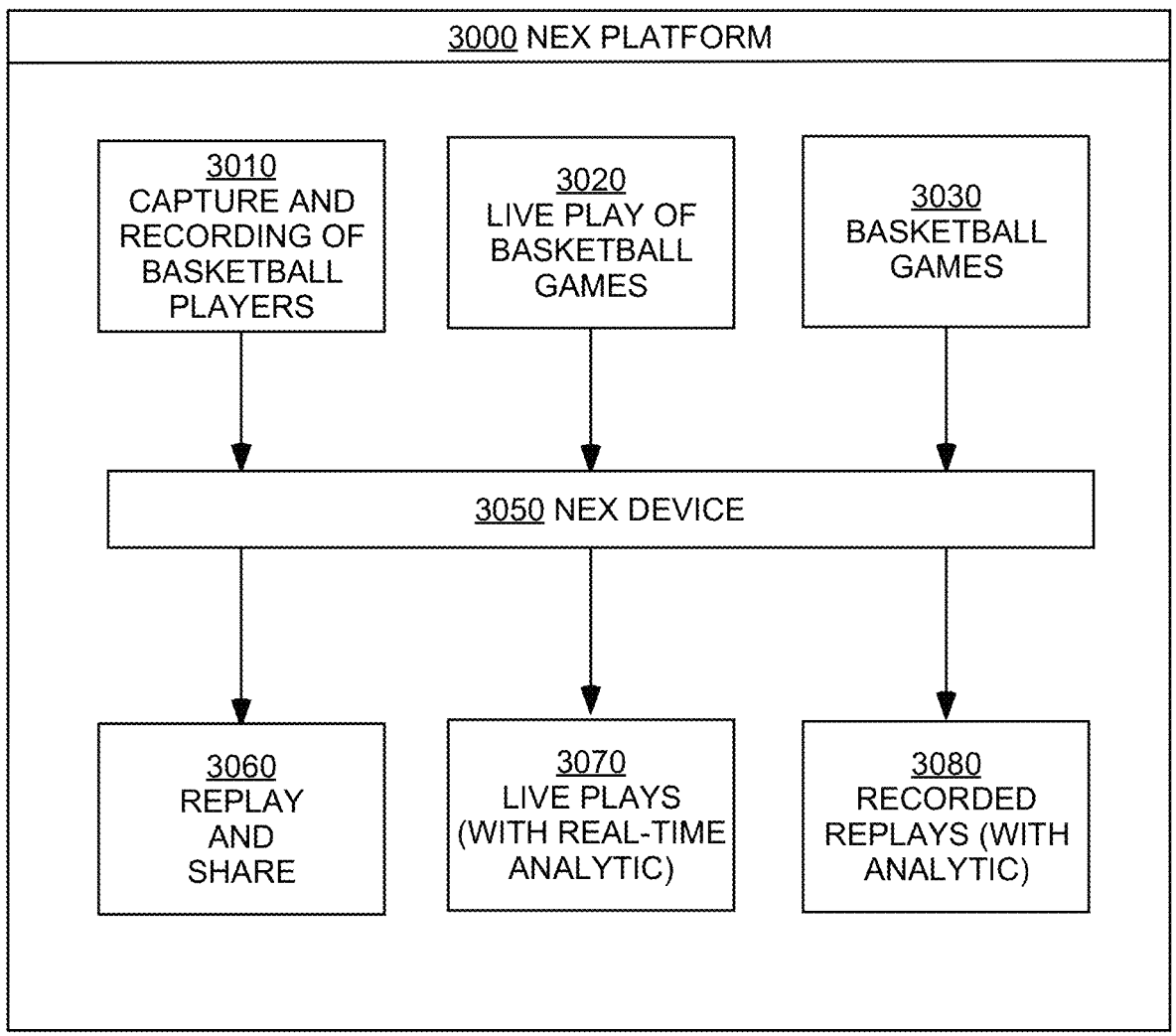
FIG. 30 is a schematic diagram illustrating a NEX platform, according to one embodiment of the present invention.

FIG. 30 is a schematic diagram illustrating functionalities provided by an extended NEX platform 3000, according to one embodiment of the present invention. Discussions within the present application have emphasized on the real-time analytics 3070 of a ball game at play, where live game plays 3020 are processed in real-time by NEX smartphone or NEX mobile device 3050. In some embodiments, NEX platform 3000 may capture basketball games 3030 and provide later replay 3080 with game analytics. Furthermore, NEX platform 3000 may receive on-demand capture and recordings 3010 of past games, such as professional games, for post-processing within NEX computing device 3050, and/or instant or on-demand replay and content sharing 3060.

Although NEX computing device 3050 as shown in FIG. 30 serves as the core for NEX platform 3000, in some embodiments, NEX platform 3000 may be networked among multiple user devices, where a NEX server 3050 may be connected to multiple camera-enabled user computing devices, each used to capture user or play data, and for providing play analytics. Such game video and/or analytics data may be uploaded to the NEX server, which in turn may store and facilitate sharing of such data among individual players/users, or participants of an online game analytics and training community.

Figure 31:
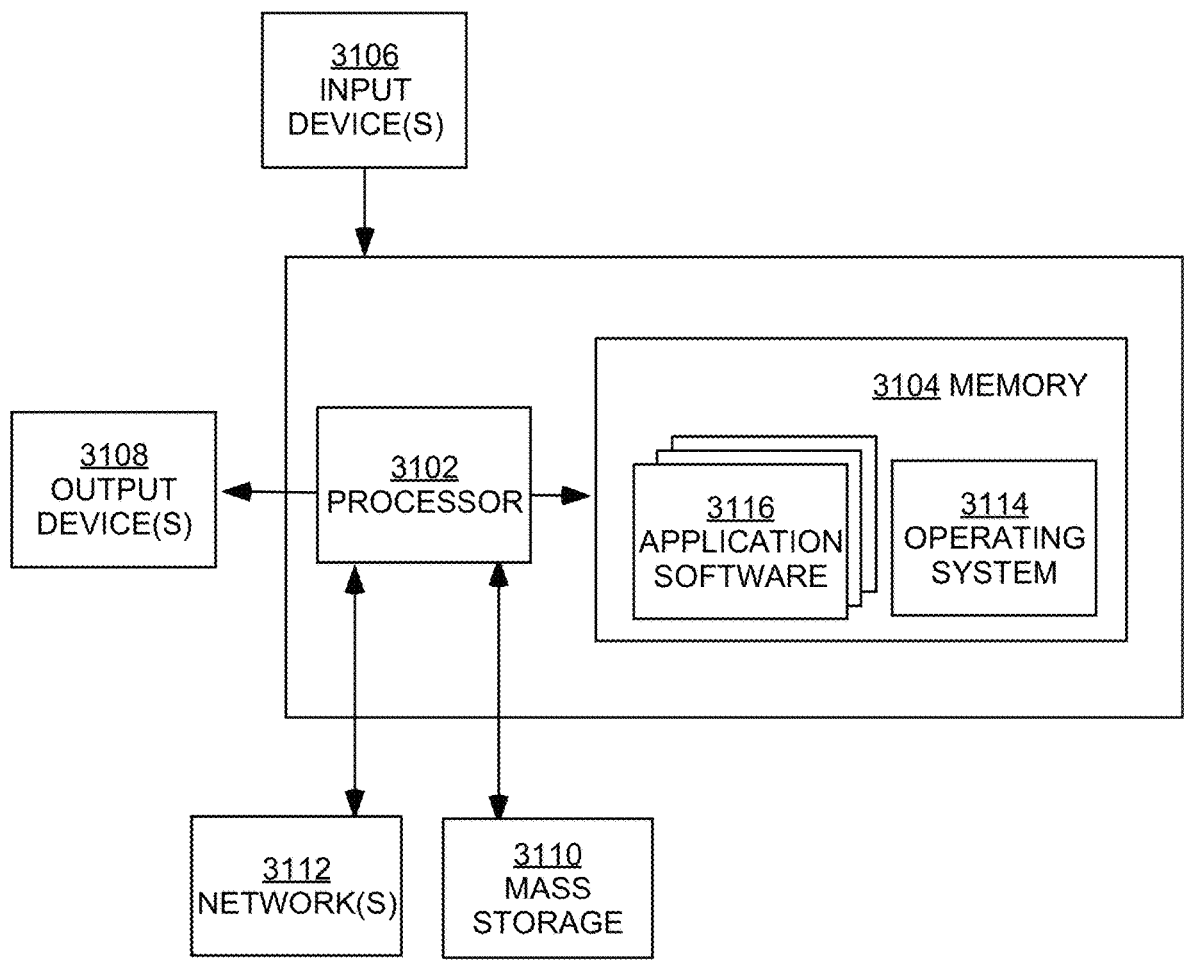
FIG. 31 is a schematic diagram of a computing device in which the present invention may be utilized, according to some embodiments of the present invention.

Finally, FIG. 31 is a schematic diagram 3100 of a computing device, such as a smartphone, tablet, or laptop, in which the present invention may be implemented, according to some embodiments of the present invention. A computing device, such as a smartphone, comprises a hardware processor 3102 for executing program code, an operating system 3114, an application software 3116, which may implement the various embodiments of the present invention described herein, a physical memory 3104, at least one input device 3106, at least one output device 3108, a mass storage device 3110, and a network 3112. The network 3112 comprises a wired or wireless network to communicate to remote servers and databases via the Internet. The program code utilized by the computing device may be provided on a non-transitory physical storage medium, such as a local hard-disk, a hard-disk in the cloud, or any other physical storage medium (not shown). Input device 3106 may comprise one or more imaging capturing devices, such as front-facing or back-facing optical cameras, thermal imaging cameras, and infrared cameras.

One of ordinary skill in the art knows that the use cases, structures, schematics, and flow diagrams may be performed in other orders or combinations, but the inventive concept of the present invention remains without departing from the broader scope of the invention. Every embodiment may be unique, and methods/steps may be either shortened or lengthened, overlapped with the other activities, postponed, delayed, and continued after a time gap, such that every end-user device is accommodated by the server to practice the methods of the present invention.

The present invention may be implemented in hardware and/or in software. Many components of the system, for example, signal processing modules or network interfaces etc., have not been shown, so as not to obscure the present invention. However, one of ordinary skill in the art would appreciate that the system necessarily includes these components. A computing device is a hardware that includes at least one processor coupled to a memory. The processor may represent one or more processors (e.g., microprocessors), and the memory may represent random access memory (RAM) devices comprising a main storage of the hardware, as well as any supplemental levels of memory, e.g., cache memories, non-volatile or back-up memories (e.g., programmable or flash memories), read-only memories, etc. In addition, the memory may be considered to include memory storage physically located elsewhere in the hardware, e.g. any cache memory in the processor, as well as any storage capacity used as a virtual memory, e.g., as stored on a mass storage device.

The hardware of a computing device also typically receives a number of inputs and outputs for communicating information externally. For interface with a user, the hardware may include one or more user input devices (e.g., a keyboard, a mouse, a scanner, a microphone, a camera, etc.) and a display (e.g., a Liquid Crystal Display (LCD) panel). For additional storage, the hardware my also include one or more mass storage devices, e.g., a floppy or other removable disk drive, a hard disk drive, a Direct Access Storage Device (DASD), an optical drive (e.g., a Compact Disk (CD) drive, a Digital Versatile Disk (DVD) drive, etc.) and/or a tape drive, among others. Furthermore, the hardware may include an interface to one or more networks (e.g., a local area network (LAN), a wide area network (WAN), a wireless network, and/or the Internet among others) to permit the communication of information with other computers coupled to the networks. It should be appreciated that the hardware typically includes suitable analog and/or digital interfaces to communicate with each other.

In some embodiments of the present invention, the entire system can be implemented and offered to the end-users and operators over the Internet, in a so-called cloud implementation. No local installation of software or hardware would be needed, and the end-users and operators would be allowed access to the systems of the present invention directly over the Internet, using either a web browser or similar software on a client, which client could be a desktop, laptop, mobile device, and so on. This eliminates any need for custom software installation on the client side and increases the flexibility of delivery of the service (software-as-a-service), and increases user satisfaction and ease of use. Various business models, revenue models, and delivery mechanisms for the present invention are envisioned, and are all to be considered within the scope of the present invention.

The hardware operates under the control of an operating system, and executes various computer software applications, components, program code, libraries, objects, modules, etc. to perform the methods, processes, and techniques described above.

In general, the method executed to implement the embodiments of the invention may be implemented as part of an operating system or a specific application, component, program, object, module or sequence of instructions referred to as "computer program(s)" or "program code(s)." The computer programs typically comprise one or more instructions set at various times in various memory and storage devices in a computing device or computer, and that, when read and executed by one or more processors in the computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of machine or computer-readable media used to actually effect the distribution. Examples of computer-readable media include but are not limited to recordable type media such as volatile and non-volatile memory devices, floppy and other removable disks, hard disk drives, optical disks (e.g., Compact Disk Read-Only Memory (CD-ROMS), Digital Versatile Disks, (DVDs), etc.), and digital and analog communication media.

Although the present invention has been described with reference to specific exemplary embodiments, it will be evident that the various modification and changes can be made to these embodiments without departing from the broader scope of the invention. Accordingly, the specification and drawings are to be regarded in an illustrative sense rather than in a restrictive sense. It will also be apparent to the skilled artisan that the embodiments described above are specific examples of a single broader invention which may have greater scope than any of the singular descriptions taught. There may be many alterations made in the descriptions without departing from the scope of the present invention.

What is claimed is:

1. A method for determining a ball shot attempt location on a ball court, comprising:
   receiving an input video captured using a camera connected to a computing device, wherein the input video comprises the ball shot attempt and one or more players;
   receiving a declared ball shot attempt, wherein the declared ball shot attempt is detected by analyzing a ball trajectory in the input video using a first machine vision algorithm, and wherein the declared ball shot attempt is associated with a ball shot attempt time;
   determining a potential shooter for the declared ball shot attempt by detecting a moving object flow in the input video, from one or more frames backtracked in reverse time from the ball shot attempt time;
   determining a potential shooter image region in an image plane by analyzing an overlapping image area of the ball trajectory and the potential shooter;
   determining a shooter foot-on-court time;
   determining a most probable pair of shooter legs in the potential shooter image region around the shooter foot-on-court time;
   determining a shooter foot location based on the most probable pair of shooter legs; and
   determining a ball shot attempt location on the ball court by applying a camera projection to the shooter foot location.

2. The method of claim 1, further comprising:
   determining a ball shot attempt result associated with the ball shot attempt; and
   updating a court-location-indexed shot performance statistics dataset based on the ball shot attempt result.

3. The method of claim 2, further comprising:
   determining a shooter identity as a player having the most probable pair of shooter legs, wherein the updating the court-location-indexed shot performance statistics dataset is further based on the shooter identity.

4. The method of claim 1, wherein the determining the most probable pair of shooter legs comprises:
   detecting one or more pairs of potential shooter legs of the potential shooter by applying a second machine vision algorithm to one or more frames around the shooter foot-on-court time, within the potential shooter image region; and
   selecting the most probable pair of shooter legs based on a player score, from the one or more pairs of potential shooter legs.

5. The method of claim 4, wherein the player score is calculated based on whether a player is in a ball moving direction, whether a player is within a projected shooter region, a distance between the ball and a top of a player bound, a distance between a center of the player bound and a center of a cropped image, and/or a historical shooting zone.

6. The method of claim 1, wherein the determining the shooter foot-on-court time is based on the ball trajectory.

7. The method of claim 1, wherein the computing device is a mobile computing device.

8. A non-transitory storage medium storing program code, the program code when executed by a processor, causes the processor to execute a process for determining a ball shot attempt location on a ball court, the program code comprising steps to:
   receive an input video captured using a camera connected to a computing device, wherein the input video comprises the ball shot attempt and one or more players;
   receive a declared ball shot attempt, wherein the declared ball shot attempt is detected by analyzing a ball trajectory in the input video using a first machine vision algorithm, and wherein the declared ball shot attempt is associated with a ball shot attempt time;
   determine a potential shooter for the declared ball shot attempt by detecting a moving object flow in the input video, from one or more frames backtracked in reverse time from the ball shot attempt time;
   determine a potential shooter image region in an image plane by analyzing an overlapping image area of the ball trajectory and the potential shooter;

determine a shooter foot-on-court time;

determine a most probable pair of shooter legs in the potential shooter image region around the shooter foot-on-court time;

determine a shooter foot location based on the most probable pair of shooter legs; and determine a ball shot attempt location on the ball court by applying a camera projection to the shooter foot location.

9. The non-transitory storage medium of claim 8, the program code further comprising steps to:

determine a ball shot attempt result associated with the ball shot attempt; and update a court-location-indexed shot performance statistics dataset based on the ball shot attempt result.

10. The non-transitory storage medium of claim 9, the program code further comprising steps to:

determine a shooter identity as a player having the most probable pair of shooter legs, wherein the program code to update the court-location-indexed shot performance statistics dataset further utilizes the shooter identity.

11. The non-transitory storage medium of claim 8, wherein the program code to determine the most probable pair of shooter legs comprises program code to:

detect one or more pairs of potential shooter legs of the potential shooter by applying a second machine vision algorithm to one or more frames around the shooter foot-on-court time, within the potential shooter image region; and select the most probable pair of shooter legs based on a player score, from the one or more pairs of potential shooter legs.

12. The non-transitory storage medium of claim 11, wherein the player score is calculated based on whether a player is in a ball moving direction, whether a player is within a projected shooter region, a distance between the ball and a top of a player bound, a distance between a center of the player bound and a center of a cropped image, and/or a historical shooting zone.

13. The non-transitory storage medium of claim 8, wherein the program code to determine the shooter foot-on-court time is based on the ball trajectory.

14. The non-transitory storage medium of claim 8, wherein the computing device is a mobile computing device.

15. A system comprising a hardware processor and a non-transitory storage medium storing program code, the program code when executed by the hardware processor, causes the hardware processor to execute a process for determining a ball shot attempt location on a ball court, the program code comprising steps to:

receive an input video captured using a camera connected to a computing device, wherein the input video comprises the ball shot attempt and one or more players;

receive a declared ball shot attempt, wherein the declared ball shot attempt is detected by analyzing a ball trajectory in the input video using a first machine vision algorithm, and wherein the declared ball shot attempt is associated with a ball shot attempt time;

determine a potential shooter for the declared ball shot attempt by detecting a moving object flow in the input video, from one or more frames backtracked in reverse time from the ball shot attempt time;

determine a potential shooter image region in an image plane by analyzing an overlapping image area of the ball trajectory and the potential shooter;

determine a shooter foot-on-court time;

determine a most probable pair of shooter legs in the potential shooter image region around the shooter foot-on-court time;

determine a shooter foot location based on the most probable pair of shooter legs; and determine a ball shot attempt location on the ball court by applying a camera projection to the shooter foot location.

16. The system of claim 15, the program code further comprising steps to:

determine a ball shot attempt result associated with the ball shot attempt; and update a court-location-indexed shot performance statistics dataset based on the ball shot attempt result.

17. The system of claim 16, the program code further comprising steps to:

determine a shooter identity as a player having the most probable pair of shooter legs, wherein the program code to update the court-location-indexed shot performance statistics dataset further utilizes the shooter identity.

18. The system of claim 15, wherein the program code to determine the most probable pair of shooter legs comprises program code to:

detect one or more pairs of potential shooter legs of the potential shooter by applying a second machine vision algorithm to one or more frames around the shooter foot-on-court time, within the potential shooter image region; and select the most probable pair of shooter legs based on a player score, from the one or more pairs of potential shooter legs.

19. The system of claim 15, wherein the program code to determine the shooter foot-on-court time is based on the ball trajectory.

20. The system of claim 15, wherein the computing device is a mobile computing device.

* * * * *